US010592396B2

(12) United States Patent
Gabryjelski et al.

(10) Patent No.: US 10,592,396 B2
(45) Date of Patent: Mar. 17, 2020

(54) MEMORY VALIDITY STATES IN TIME-TRAVEL DEBUGGING

(71) Applicant: MICROSOFT TECHNOLOGY LICENSING, LLC, Redmond, WA (US)

(72) Inventors: Henry Gabryjelski, Sammamish, WA (US); Jackson Michael Davis, Carnation, WA (US); Patrick Lothian Nelson, Redmond, WA (US); Del Myers, Seattle, WA (US); Thomas Lai, Redmond, WA (US); Jordi Mola, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/960,066

(22) Filed: Apr. 23, 2018

(65) Prior Publication Data

US 2019/0324892 A1 Oct. 24, 2019

(51) Int. Cl.
*G06F 11/36* (2006.01)
*G06F 11/32* (2006.01)

(52) U.S. Cl.
CPC ........ *G06F 11/3664* (2013.01); *G06F 11/323* (2013.01); *G06F 11/3636* (2013.01)

(58) Field of Classification Search
CPC ............. G06F 11/3636; G06F 11/3466; G06F 11/3476; G06F 11/3664; G06F 11/323;

(Continued)

(56) References Cited

U.S. PATENT DOCUMENTS 5,375,125 A * 12/1994 Oshima ................. G06F 11/323
714/38.13
5,956,512 A 9/1999 Simmons et al.
(Continued)

FOREIGN PATENT DOCUMENTS

WO 2018071450 A1 4/2018

OTHER PUBLICATIONS

Hoffswell, et al., "Visual Debugging Techniques for Reactive Data Visualization", In Proceedings of Eurographics Conference on Visualization, vol. 35, Issue 3, Jun. 6, 2016, 10 Pages.

(Continued)

*Primary Examiner* — Emerson C Puente
*Assistant Examiner* — Erika Kretzmer
(74) *Attorney, Agent, or Firm* — Workman Nydegger

(57) ABSTRACT

Presenting historical state associated with prior execution of an entity. Based on replaying segment(s) of execution of an entity based on a trace, embodiments could present an indication of whether a value of a code element is, at a first execution time point, unknown, known, previously known, and/or known in the future. Additionally, or alternatively, embodiments could present an indication of a value relied upon by simulated execution of a function at a second execution time point, along with an indication of a timing of knowledge of the value in relation to the second execution time point. Additionally, or alternatively, embodiments could present an indication that a return value of a function would be known if the function had executed at a third execution time point, or an indication that the return value would be unknown if the function had executed at the third execution time point.

19 Claims, 22 Drawing Sheets

(58) Field of Classification Search
CPC ..... G06F 8/34; G06F 8/35; G06F 8/10; G06F 8/30
See application file for complete search history.

(56) References Cited

U.S. PATENT DOCUMENTS

| | | | |
|---|---|---|---|
| 6,148,381 | A | 11/2000 | Jotwani |
| 6,523,169 | B1* | 2/2003 | Glunz ................. G06F 11/3688 714/1 |
| 7,840,849 | B2 | 11/2010 | O'Callahan |
| 8,271,955 | B1 | 9/2012 | Lindahl et al. |
| 8,601,442 | B2 | 12/2013 | Shafi |
| 8,819,641 | B1 | 8/2014 | Sweeney |
| 8,935,673 | B1* | 1/2015 | Ashkenazi .......... G06F 11/3636 702/186 |
| 8,996,812 | B2* | 3/2015 | Kornegay ........... G06F 12/0817 711/122 |
| 9,286,186 | B2 | 3/2016 | Weiss et al. |
| 9,355,012 | B2* | 5/2016 | Rosen .................. G06F 11/362 |
| 9,465,721 | B2* | 10/2016 | Garrett ................. G06F 11/366 |
| 9,734,040 | B2 | 8/2017 | Gounares |
| 9,778,969 | B2 | 10/2017 | Liu |
| 9,898,385 | B1* | 2/2018 | O'Dowd ............. G06F 11/3636 |
| 9,940,369 | B1 | 4/2018 | Mola |
| 2006/0248512 | A1* | 11/2006 | Messmer ............ G06F 11/3476 717/125 |
| 2008/0022265 | A1* | 1/2008 | Morris ..................... G06F 8/41 717/140 |
| 2010/0325367 | A1* | 12/2010 | Kornegay ........... G06F 12/0804 711/143 |
| 2011/0307870 | A1 | 12/2011 | Stairs et al. |
| 2013/0219366 | A1* | 8/2013 | Rosen ................. G06F 11/3624 717/125 |
| 2018/0024911 | A1 | 1/2018 | Kruszewski et al. |
| 2018/0253369 | A1* | 9/2018 | O'Dowd ............. G06F 11/3636 |
| 2019/0065339 | A1* | 2/2019 | Mola ................... G06F 11/3476 |
| 2019/0087305 | A1* | 3/2019 | Mola ..................... G06F 11/364 |
| 2019/0325980 | A1 | 10/2019 | Nelson et al. |

OTHER PUBLICATIONS

Montesinos, et al., "Capo: A Software-hardware Interface for Practical Deterministic Multiprocessor Replay", In Proceedings of International Conference Architectural Support for Programming Languages and Operating Systems, Mar. 7, 2009, 12 Pages.

"International Search Report and Written Opinion Issued in PCT Application No. PCT/US2019/026209", dated Jul. 23, 2019, 15 Pages. (MS# 404296-WO-PCT).

"International Search Report and Written Opinion Issued in PCT Application No. PCT/US2019/027573", dated Jul. 15, 2019, 18 Pages. (MS# 404080-WO-PCT).

"Non Final Office Action Issued in U.S. Appl. No. 15/960,177", dated May 31, 2019, 5 Pages. (MS# 404080-US-NP).

* cited by examiner

FIG. 4A

DEBUGGER — 401 orderer.cs — 400b

```
21      {
22          return;
23      }
24
25      //Split in half, and sort each side.
26      int half = (end - start) / 2;
27
28      int leftStart = start;
29      int leftEnd   = start + half;
30      int rightStart = leftEnd+1;
31      int rightEnd  = end;
32
33      MergeSortRecursive(target, source, leftStart, leftEnd);
34      MergeSortRecursive(target, source, rightStart, rightEnd);
35
36      // Merge the sorted halves.
37      Merge(source, target, start, leftStart, leftEnd, rightStart, rightEnd);
38
39  }
40
41  private void Merge(int[] source, int[] target, int start, int leftStart,
                       int leftEnd, int rightStart, int rightEnd)
42  {
43      int insert = start;
44      int i = leftStart;
45      int j = rightStart;
46
47      var leftSide  = source.Skip(leftStart).Take(leftEnd-leftStart+1);
48      var rightSide = source.Skip(rightStart).Take(leftEnd-rightStart+1);
49      Console.WriteLine($"Merging [{string.Join(",", leftSide)}] with
            [{string.Join(",", rightSide)}]");
50
51      //Merge the values until we get to the end of the full segment
52      while (insert < rightEnd)
53      {
54          //If both read indexes are inside their respective segments,
                compare the values
```

TOOLS — 404

Events

| 2:30 | 2:40 |

STATE — 403

| Name | Value | Type |
|---|---|---|
| ▲■ source | [Last Known Value][int[4]] | int[] |
| ▼■ target | [Last Known Value][int[4]] | int[] |
|   [0] | [Last Known Value] 356 | int |
|   [1] | [Last Known Value] 9 | int |
|   [2] | [Last Known Value] 112 | int |
|   [3] | [Last Known Value] 94 | int |

DEBUGGER orderer.cs

```
21      {
22          return;
23      }
24
25      //Split in half, and sort each side.
26      int half = (end - start) / 2;
27
28      int leftStart = start;
29      int leftEnd = start + half;
30      int rightStart = leftEnd+1;
31      int rightEnd = end;
32
33      MergeSortRecursive(target, source, leftStart, leftEnd);
34      MergeSortRecursive(target, source, rightStart, rightEnd);
35
36      // Merge the sorted halves.
37      Merge(source, target, start, leftStart, leftEnd, rightStart, rightEnd);
38
39  }
40
41  private void Merge(int[] source, int[] target, int start, int leftStart,
42      int leftEnd, int rightStart, int rightEnd)
43  {
44      int insert = start;
45      int i = leftStart;
46      int j = rightStart;
47
48      var leftSide = source.Skip(leftStart).Take(leftEnd-leftStart+1);
49      var rightSide = source.Skip(rightStart).Take(leftEnd-rightsStart+1);
50      Console.WriteLine($"Merging [{string.Join(",", leftSide)}] with
51          [{string.Join(",", rightSide)}]");
52
53      //Merge the values until we get to the end of the full segment
54  →   while (insert < rightEnd)
55      {
56          //If both read indexes are inside their respective segments,
57          compare the values
```

TOOLS

Events

STATE

| Name | Value | Type |
|---|---|---|
| ▲■ source | [Last Known Value](int[4]) | int[] |
| ■ target | [Last Known Value](int[4]) | int[] |
| [0] | [Last Known Value] 356 | int |
| [1] | [Last Known Value] 9 | int |
| [2] | [Last Known Value] 112 | int |
| [3] | [Last Known Value] 94 | int |

This expression was evaluated using data read at an earlier time in the process's execution. View History

DEBUGGER

| orderer.cs | | TOOLS |
|---|---|---|

```
21
22         return;
23      }
24
25      //Split in half, and sort each side.
26      int half = (end - start) / 2;
27
28      int leftStart = start;
29      int leftEnd = start + half;
30      int rightStart = leftEnd+1;
31      int rightEnd = end;
32
33      MergeSortRecursive(target, source, leftStart, leftEnd);
34      MergeSortRecursive(target, source, rightStart, rightEnd);
35
36      // Merge the sorted halves.
37      Merge(source, target, start, leftEnd, rightStart, rightEnd);
38
39  }
40
41  private void Merge(int[] source, int[] target, int start, int leftStart,
42                     int leftEnd, int rightStart, int rightEnd)
43  {
44      int insert = start;
45      int i = leftStart;
46      int j = rightStart;
47
48      var leftSide = source.Skip(leftStart).Take(leftEnd-leftStart+1);
49      var rightSide = source.Skip(rightStart).Take(leftEnd-rightStart+1);
50      Console.WriteLine($"Merging [{string.Join(",", leftSide)}] with
51                        [{string.Join(",", rightSide)}]");
52
53      //Merge the values until we get to the end of the full segment
54      while (insert < rightEnd)
55      {
56          //If both read indexes are inside their respective segments,
57          compare the values
```

Events target: [9,9,112,94]

STATE

| Name | Value | Type |
|---|---|---|
| ▲■ source | [Last Known Value][int[4]] | int[] |
| ▲■ target | [Last Known Value][int[4]] | int[] |
| ■ [0] | [Last Known Value] 356 | int |
| ■ [1] | [Last Known Value] 9 | int |
| ■ [2] | [Last Known Value] 112 | int |
| ■ [3] | [Last Known Value] 94 | int |

FIG. 4F

DEBUGGER orderer.cs

```
41    private void Merge(int[] source, int[] target, int start, int leftStart,
42        int leftEnd, int rightStart, int rightEnd)
43    {
44        int insert = start;
45        int i = leftStart;
46        int j = rightStart;
47
48        var leftSide = source.Skip(leftStart).Take(leftEnd-leftStart+1);
49        var rightSide = source.Skip(rightStart).Take(leftEnd-rightsStart+1);
          Console.WriteLine($"Merging [{string.Join(",", leftSide)}] with
          [{string.Join(",", rightSide)}]");
50
51        //Merge the values until we get to the end of the full segment
52        while (insert < rightEnd)
53        {
54            //If both read indexes are inside their respective segments,
55                compare the values
56            if diff = 1;
57            if ((i <= leftEnd) && (j <= rightEnd))
58            {
59                diff = source[i] - source[j];
60            }
61            if ((j > rightEnd) || (diff <= 0))
62            {
63                //Merge from the left segment
64                target[insert] = source[i];
65                i++;
66                insert++;
67            }
68            else
69            {
70                // Merge from the right segment
71                target[insert] = source[j];
72                j++;
73                insert++;
74            }
```

TOOLS

Events

| 2:30 | 2:40 | target: [9,9,112,94]

STATE

| Name | Value | Type |
|---|---|---|
| source | {int[4]} | int[] |
| target | {int[4]} | int[] |
| [0] | 9 | int |
| [1] | 9 | int |
| [2] | 112 | int |
| [3] | 94 | int |

DEBUGGER                                                                          ☒

| orderer.cs | 404 |
|---|---|

```
41    private void Merge(int[] source, int[] target, int start, int leftStart,   402
42        int leftEnd, int rightStart, int rightEnd)
43    {
44        int insert = start;
45        int i = leftStart;
46        int j = rightStart;
47
48        var leftSide = source.Skip(leftStart).Take(leftEnd-leftStart+1);
49        var rightSide = source.Skip(rightStart).Take(leftEnd-rightsStart+1);
         Console.WriteLine($"Merging {[string.Join(",", leftSide)]} with
         [string.Join(",", rightSide)]]");
50
51        //Merge the values until we get to the end of the full segment
52        while (insert < rightEnd)
53        {
54
55            //If both read indexes are inside their respective segments,
                  compare the values
56            if diff = 1;
57            if ((i <= leftEnd) && (j <= rightEnd))
58            {
59                diff = source[i] - source[j];
60            }
61            if ((j > rightEnd) || (diff <= 0))
62            {
63                //Merge from the left segment
64                target[insert] = source[i];
65                i++;
66                insert++;
67            }
68            else
69            {
      415       //Merge from the right segment
   A  70            target[insert] - source[j];
      71            j++;
      72            insert++;
      73        }
      74    }
```
                                                                                    403

TOOLS

```
         2:30      2:40
                              410h
Events
  ≡   ◇   ◆    ◆
      ◇   ◇    ◆
                              410i
```

STATE

| Name | Value | Type |
|---|---|---|
| ▲■ source | {int[4]} | int[] |
| ▼■ target | {int[4]} | int[] |
| [0] | 9 | int |
| [1] | 9 | int |
| [2] | 112 | int |
| [3] | 94 | int |

400H 401
416

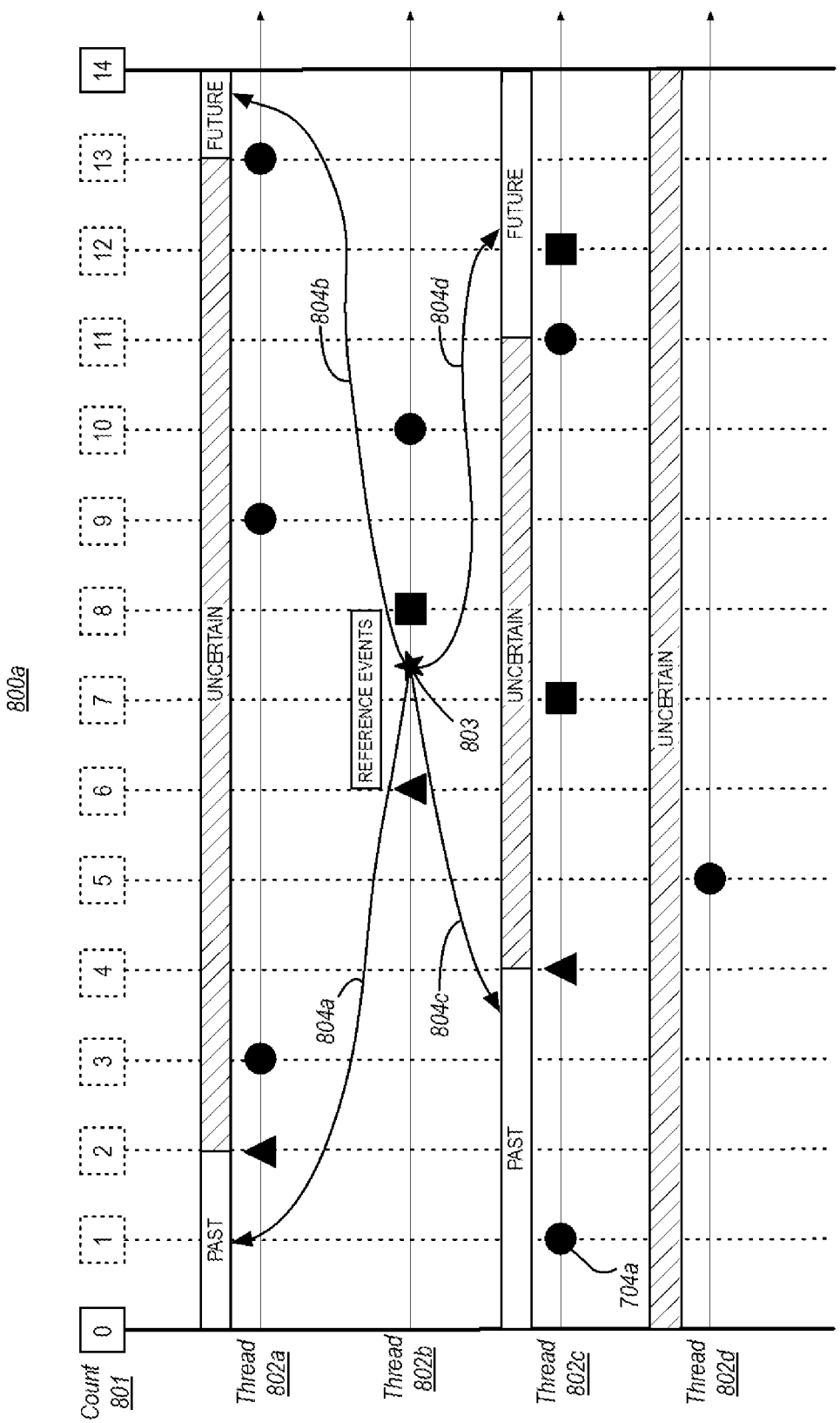

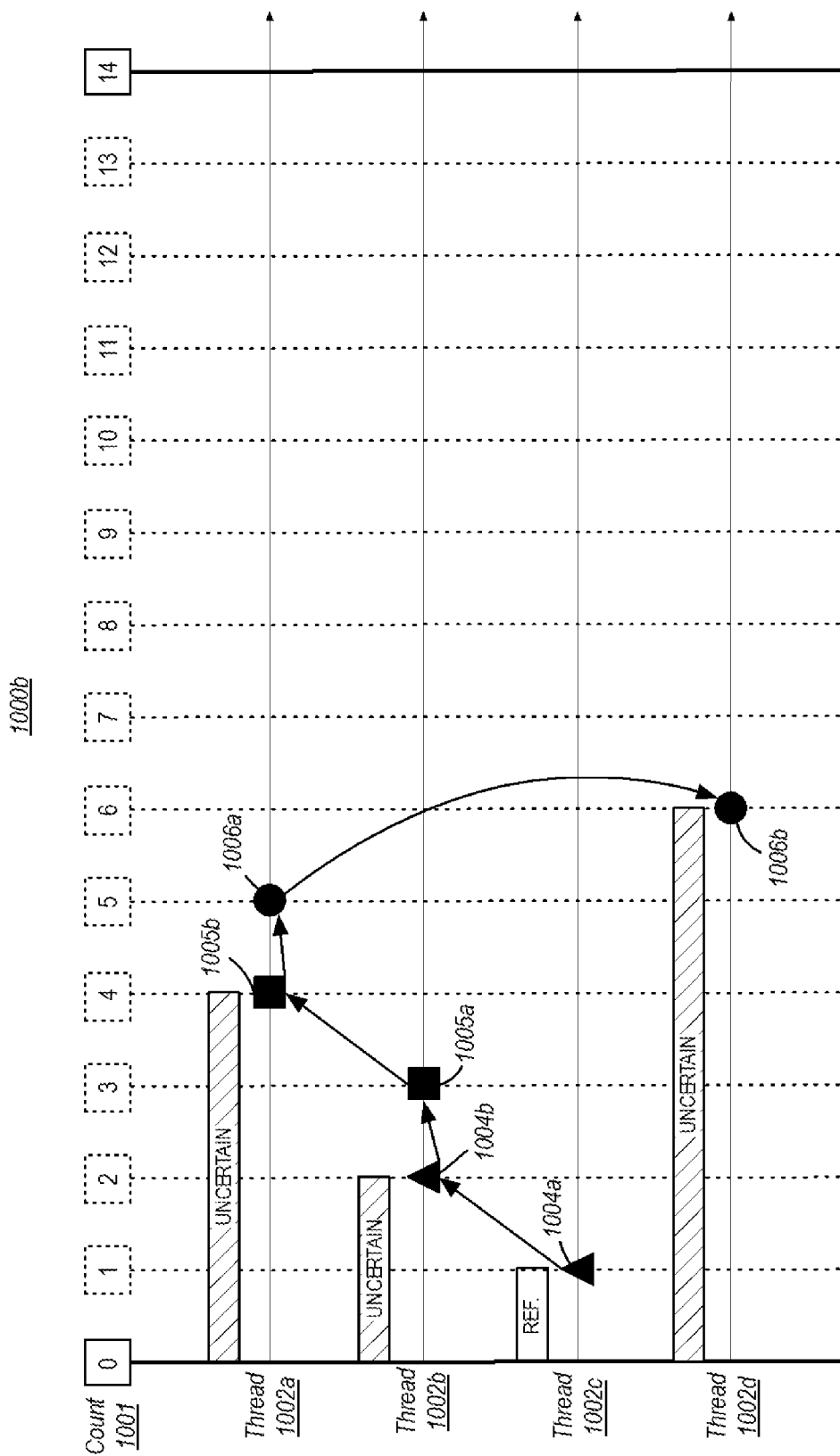

1

MEMORY VALIDITY STATES IN TIME-TRAVEL DEBUGGING

CROSS-REFERENCE TO RELATED APPLICATIONS

This application is related to U.S. patent application Ser. No. 15/959,881, filed Apr. 23, 2018, and titled "VISUALIZING LAST/NEXT KNOWN DATA VALUES IN TIME TRAVEL TRACES", the entire content of which is incorporated by reference herein in its entirety.

BACKGROUND

When writing code during the development of software applications, developers commonly spend a significant amount of time "debugging" the code to find runtime and other source code errors. In doing so, developers may take several approaches to reproduce and localize a source code bug, such as observing the behavior of a program based on different inputs, inserting debugging code (e.g., to print variable values, to track branches of execution, etc.), temporarily removing code portions, etc. Tracking down runtime errors to pinpoint code bugs can occupy a significant portion of application development time.

Many types of debugging applications ("debuggers") have been developed in order to assist developers with the code debugging process. These tools offer developers the ability to trace, visualize, and alter the execution of computer code. For example, debuggers may visualize the execution of code instructions, may present code variable values at various times during code execution, may enable developers to alter code execution paths, and/or may enable developers to set "breakpoints" and/or "watchpoints" on code elements of interest (which, when reached during execution, causes execution of the code to be suspended), among other things.

An emerging form of debugging applications enable "time travel," "reverse," or "historic" debugging. With "time travel" debugging, execution of a program (e.g., executable entities such as threads) is recorded/traced by a trace application into one or more trace data streams that record a "bit accurate" trace of that execution. These trace data stream(s) can then be used to replay execution of the program later, for both forward and backward analysis. For example, "time travel" debuggers can enable a developer to set forward breakpoints/watchpoints (like conventional debuggers) as well as reverse breakpoints/watchpoints.

BRIEF SUMMARY

At least some embodiments described herein leverage the wealth of information recorded in bit-accurate time travel traces to provide rich debugging experiences, including providing one or more visualizations of historical state associated with code element(s) that are part of a prior execution of an entity. For example, embodiments of a debugger could leverage time travel trace data, including data indicative of both when a memory value was read from a cache, as well as how long the value remained present in the cache, to present in a debugger known data values of one or more variables and/or data structures, to present in a debugger return value(s) of one or more functions (including functions that rely on a plurality of memory values), etc. Visualizations of such data could include indicating whether a value of a code element is known, unknown, previously known, known in the future, known with an indicated certainty, and the like, with respect to a current execution time point for a particular entity (e.g., thread) that is being presented in a debugger. Visualizations could, additionally or alternatively, include indicating the value(s) of a code element across entities (e.g., threads), including the relative timing in each entity at which a displayed value is known.

Embodiments can include methods, systems, and computer program products for presenting historical state associated with a code element that is part of a prior execution of an entity. An example embodiment includes replaying one or more segments of the prior execution of the entity based on one or more trace data streams storing a trace of the prior execution of the entity. The example embodiment also includes, based on replaying the one or more segments of the prior execution of the entity, presenting historical state associated with the code element. Presenting historical state can include, in connection with a first execution time point in the prior execution of the entity, presenting at a user interface a first state of the code element, the first state of the code element being based on a first memory access associated with the code element at the first execution time point. Presenting historical state can also include, in connection with a different execution time point in the prior execution of the entity, presenting at the user interface the first state of the code element along with an indication that the first state of the code element is at least one of (i) a last known state based on the different execution time point being after the first execution time point, but prior to a second memory access associated with the code element at a second execution time point in the prior execution of the entity, or (ii) a next known state based on the different execution time point being prior to the first execution time point, but after a third memory access associated with the code element at a third execution time point in the prior execution of the entity.

Another example embodiment includes replaying one or more segments of a prior execution of an entity based on one or more trace data streams storing a trace of at least the prior execution of the entity. Based on replaying the one or more segments of the prior execution of the entity, the embodiment includes, in connection with a first execution time point in the prior execution of the entity, presenting at a user interface a first indication of whether a memory value of a code element is, at the first execution time point, at least one of unknown, known, previously known, or known in the future. Additionally, or alternatively, the embodiment includes, in connection with a second execution time point in the prior execution of the entity, presenting at the user interface a second indication of at least one value relied upon by simulated execution of a first function, along with an indication of a timing of knowledge of the at least one value in relation to the second execution time point. Additionally, or alternatively, the embodiment includes, in connection with a third execution time point in the prior execution of the entity, presenting at the user interface a third indication that (i) a return value of a second function would be known if the second function had executed at the third execution time point, based at least on values of all memory locations used by the second function being available in the one or more trace data streams, or (ii) a return value of the second function would be unknown if the second function had executed at the third execution time point, based at least on a value of at least one memory location used by the second function being unavailable in the one or more trace data streams.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4A illustrates an example user interface showing current state of a code element, in reliance on a trace of execution of an entity to which the code element belongs;

FIG. 4B illustrates a first example user interface showing indication(s) of last known state of a code element, in reliance on a trace of execution of an entity to which the code element belongs;

FIG. 4C illustrates a second example user interface showing indication(s) of last known state of a code element, in reliance on a trace of execution of an entity to which the code element belongs;

FIG. 4D illustrates a first example user interface showing a history of state of a code element, in reliance on a trace of execution of an entity to which the code element belongs;

FIG. 4E illustrates a second example user interface showing a history of state of a code element, in reliance on a trace of execution of an entity to which the code element belongs;

FIG. 4F illustrates a third example user interface showing a history of state of a code element, in reliance on a trace of execution of an entity to which the code element belongs;

FIG. 4G illustrates an example user interface showing a history of state of a plurality of code elements, in reliance on a trace of execution of an entity to which the code element belongs;

FIG. 4H illustrates an example user interface showing bookmarks on a history of state of one or more code elements, in reliance on a trace of execution of an entity to which the code element belongs;

FIG. 8A illustrates an example of evaluating a function, such as a property getter, during trace replay and debugging in which the relative ordering of all memory accesses is known;

FIG. 10B illustrates an example timing diagram that shows regions of uncertainty in relation to FIG. 10A.

DETAILED DESCRIPTION

At least some embodiments described herein leverage the wealth of information recorded in bit-accurate time travel traces to provide rich debugging experiences, including providing one or more visualizations of historical state associated with code element(s) that are part of a prior execution of an entity. For example, embodiments of a debugger could leverage time travel trace data, including data indicative of both when a memory value was read from a cache, as well as how long the value remained present in the cache, to present in a debugger known data values of one or more variables and/or data structures, to present in a debugger return value(s) of one or more functions (including functions that rely on a plurality of memory values), etc. Visualizations of such data could include indicating whether a value of a code element is known, unknown, previously known, known in the future, known with an indicated certainty, and the like, with respect to a current execution time point for a particular entity (e.g., thread) that is being presented in a debugger. Visualizations could, additionally or alternatively, include indicating the value(s) of a code element across entities (e.g., threads), including the relative timing in each entity at which a displayed value is known.

The visualization embodiments described herein provide a richness of data not available in prior forms of debugging, and that can greatly enhance the ability of a debugger to present the operation of program code. By providing this richness of data, the visualization embodiments described herein provide improvements to the functioning of computers, and particularly those that are used for code debugging. For example, the visualization embodiments described herein enable computer systems to do things they could not do before—i.e., leveraging time travel trace data to present and interact with historical state associated with code element(s) that are part of a prior execution of an entity, in the various manners described herein. In doing so, these visualization embodiments also improve the efficiency of use of a computer system during debugging and can, therefore, dramatically decrease the amount of time it takes to debug code. Improving the efficiency of use of a computer system during debugging could also reduce an overall time spent by a developer using computing resources during the debugging process.

Figure 1:
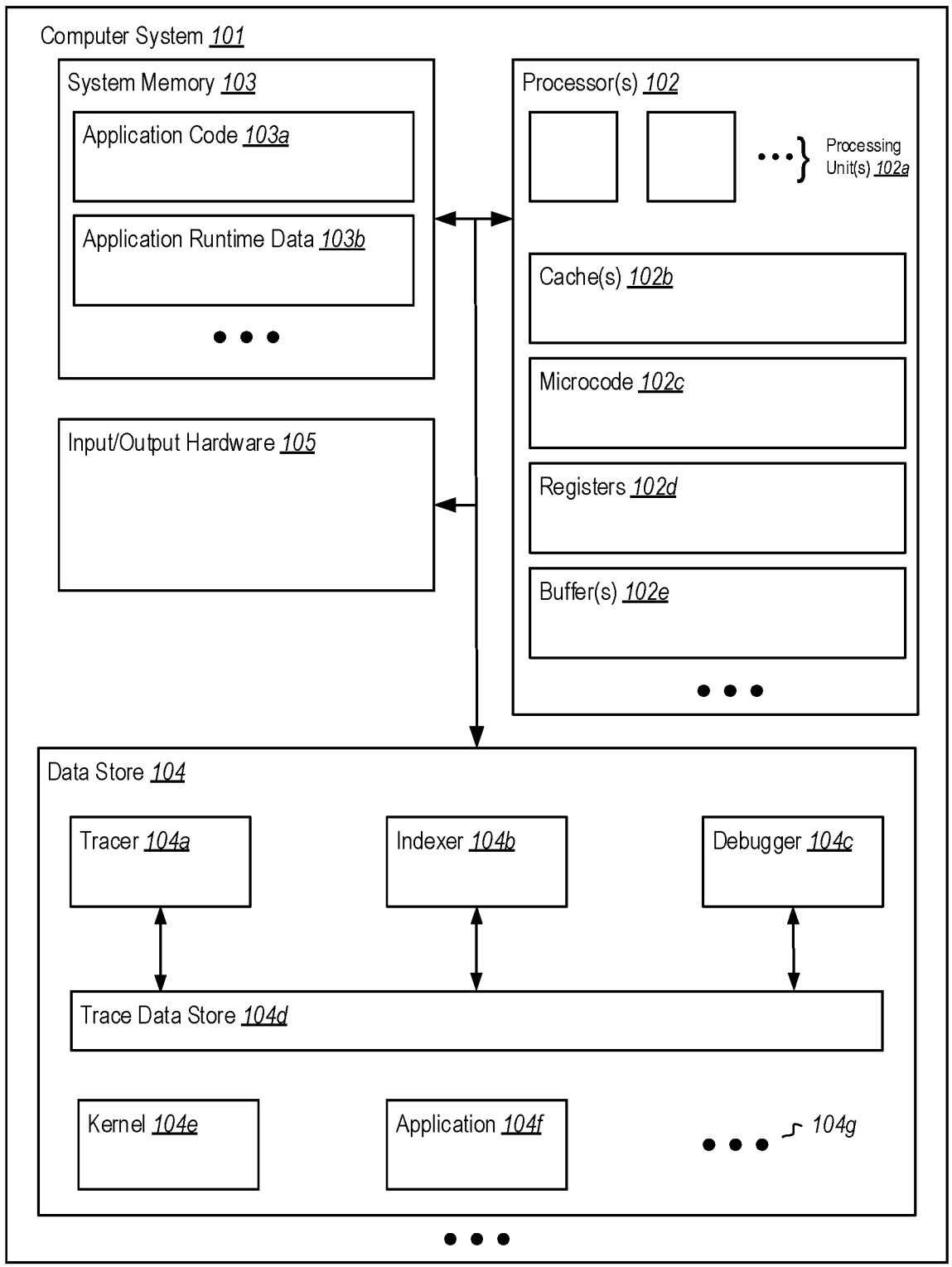
FIG. 1 illustrates an example computer architecture that facilitates presenting historical state associated with a code element that is part of a prior execution of an entity.

FIG. 1 illustrates an example computing environment 100 that facilitates providing visualizations of historical state associated with code element(s) that are part of a prior execution of an entity. As depicted, embodiments may comprise or utilize a special-purpose or general-purpose computer system 101 that includes computer hardware, such as, for example, one or more processor(s) 102, system memory 103, one or more data stores 104, and/or input/output hardware 105.

Embodiments within the scope of the present invention include physical and other computer-readable media for carrying or storing computer-executable instructions and/or data structures. Such computer-readable media can be any available media that can be accessed by the computer system 101. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the computer system 101 to implement the disclosed functionality of the invention. Thus, for example, computer storage devices may include the depicted system memory 103, the depicted data store 104 which can store computer-executable instructions and/or data structures, or other storage such as on-processor storage, as discussed later.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media. For example, the input/output hardware 105 may comprise hardware (e.g., a network interface module (e.g., a "NIC")) that connects a network and/or data link which can be used to carry program code in the form of computer-executable instructions or data structures.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within a NIC (e.g., input/output hardware 105), and then eventually transferred to the system memory 103 and/or to less volatile computer storage devices (e.g., data store 104) at the computer system 101. Thus, it should be understood that computer storage devices can be included in computer system components that also (or even primarily) utilize transmission media.

Computer-executable instructions comprise, for example, instructions and data which, when executed at the processor(s) 102, cause the computer system 101 to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

FIG. 1 includes a simplified representation of the internal hardware components of the processor(s) 102. As illustrated, each processor 102 includes a plurality of processing unit(s) 102a. Each processing unit may be physical (i.e., a physical processor core) and/or logical (i.e., a logical core presented by a physical core that supports hyper-threading, in which more than one application threads executes at the physical core). Thus, for example, even though the processor 102 may in some embodiments include only a single physical processing unit (core), it could include two or more logical processing units 102a presented by that single physical processing unit.

Each processing unit 102a executes processor instructions that are defined by applications (e.g., tracer 104a, operating kernel 104e, application 104f, etc.), and which instructions are selected from among a predefined processor instruction set architecture (ISA). The particular ISA of each processor 102 varies based on processor manufacturer and processor model. Common ISAs include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other ISAs exist and can be used by the present invention. In general, an "instruction" is the smallest externally-visible (i.e., external to the processor) unit of code that is executable by a processor.

Each processing unit 102a obtains processor instructions from one or more processor cache(s) 102b and executes the processor instructions based on data in the cache(s) 102b, based on data in registers 102d, and/or without input data. In general, each cache 102b is a small amount (i.e., small relative to the typical amount of system memory 103) of random-access memory that stores on-processor copies of portions of a backing store, such as the system memory 103 and/or another cache in the cache(s) 102b. For example, when executing the application code 103a, one or more of the cache(s) 102b contain portions of the application runtime data 103b. If the processing unit(s) 102a request data not already stored in a particular cache 102b, then a "cache miss" occurs, and that data is fetched from the system memory 103 or another cache, potentially "evicting" some other data from that cache 102b. The cache(s) 102b may include code cache portions and data cache portions. When executing the application code 103a, the code portion(s) of the cache(s) 102b may store at least a portion of the processor instructions stored in the application code 103a and the data portion(s) of the cache(s) 102b may store at least a portion of data structures of the application runtime data 103b.

Each processor 102 also includes microcode 102c, which comprises control logic (i.e., executable instructions) that control operation of the processor 102, and which generally functions as an interpreter between the hardware of the processor and the processor ISA exposed by the processor 102 to executing applications. The microcode 102 is typically embodied on on-processor storage, such as ROM, EEPROM, etc.

Registers 102d are hardware-based storage locations that are defined based on the ISA of the processors(s) 102 and that are read from and/or written to by processor instructions. For example, registers 102d are commonly used to store values fetched from the cache(s) 102b for use by instructions, to store the results of executing instructions, and/or to store status or state—such as some of the side-effects of executing instructions (e.g., the sign of a value changing, a value reaching zero, the occurrence of a carry, etc.), a processor cycle count, etc. Thus, some registers 102d may comprise "flags" that are used to signal some state change caused by executing processor instructions. In some embodiments, processors 102 may also include control registers, which are used to control different aspects of processor operation. Although FIG. 1 depicts registers 102d as a single box, it will be appreciated that each processing unit 102a typically includes one or more corresponding sets of registers 102d that are specific to that processing unit.

The data store 104 can store computer-executable instructions representing application programs such as, for example, a tracer 104a, an indexer 104b, a debugger 104c, an operating system kernel 104e, an application 104f (e.g., the application that is the subject of tracing by the tracer 104a). When these programs are executing (e.g., using the processor(s) 102), the system memory 103 can store corresponding runtime data, such as runtime data structures, computer-executable instructions, etc. Thus, FIG. 1 illustrates the system memory 103 as including time application code 103a and application runtime data 103b (e.g., each corresponding with application 1040. The data store 104 can further store data structures, such as trace data stored within one or more trace data stores 104d. As indicated by the ellipses 104g, the data store 104 could also store other computer-executable instructions and/or data structures.

The tracer 104a is usable to record a bit-accurate trace of execution of one or more entities, such as one or more threads of an application 104f or kernel 104e, and to store the trace data into the trace data store 104d. In some embodiments, the tracer 104a is a standalone application, while in other embodiments the tracer 104a is integrated into another software component, such as the kernel 104e, a hypervisor, a cloud fabric, etc. While the trace data store 104d is depicted as being part of the data store 104, the trace data store 104d may also be embodied, as least in part, in the system memory 103, in the cache(s) 102b, or at some other storage device.

In some embodiments, the tracer 104a records a bit-accurate trace of execution of one or more entities. As used herein, a "bit accurate" trace is a trace that includes sufficient data to enable code that was previously executed at one or more processing units 102a to be replayed, such that it executes in substantially the same manner at replay time as it did during tracing. There are a variety of approaches the tracer 104a might use to record bit-accurate traces. Two different families of approaches that provide high levels of performance and reasonable trace size are now briefly summarized, though it will be appreciated that the embodiments herein can operate in connection with traces recorded using other approaches. Additionally, optimizations could be applied to either of these families of approaches that, for brevity, are not described herein.

A first family of approaches is built upon the recognition that processor instructions (including virtual machine "virtual processor" instructions) generally fall into one of three categories: (1) instructions identified as "non-deterministic" as not producing predictable outputs because their outputs are not fully determined by data in general registers 102d or the cache(s) 102b, (2) deterministic instructions whose inputs do not depend on memory values (e.g., they depend only on processor register values, or values defined in the code itself), and (3) deterministic instructions whose inputs depend on reading values from memory. Thus, in some embodiments, storing enough state data to reproduce the execution of instructions can be accomplished by addressing: (1) how to record non-deterministic instructions that produce output not fully determined by their inputs, (2) how to reproduce the values of input registers for instructions depending on registers, and (3) how to reproduce the values of input memory for instructions depending on memory reads.

In some embodiments, the first approach(es) for recording traces records non-deterministic instructions that produce output not fully determined by their inputs by storing into the trace data store 104d the side-effects of execution of such instructions. As used herein, "non-deterministic" instructions can include somewhat less common instructions that (i) produce non-deterministic output each time they are executed (e.g., RDTSC on INTEL processors, which writes the number of processor cycles since the last processor reset into a register), that (ii) may produce a deterministic output, but depend on inputs not tracked by the tracer 104a (e.g. debug registers, timers, etc.), and/or that (iii) produce processor-specific information (e.g., CPUID on INTEL processors, which writes processor-specific data into registers). Storing the side-effects of execution of such instructions may include, for example, storing register values and/or memory values that were changed by execution of the instruction. In some architectures, such as from INTEL, processor features such as those found in Virtual Machine eXtensions (VMX) could be used to trap instructions for recording their side effects into the trace data store 104d.

Addressing how to reproduce the values of input registers for deterministic instructions (e.g., whose inputs depend only on processor register values) is straightforward, as they are the outputs of the execution of the prior instruction(s). Thus, the first approach(es) for recording traces can therefore reduce recording the execution of an entire series of processor instructions into the trace data store 104d to reproducing the register values at the beginning of the series; the trace data in the trace data store 104d need not store a record of which particular instructions executed in the series, or the intermediary register values. This is because the actual instructions are available from the application code 103a, itself. These instructions can therefore be supplied the recorded inputs (i.e., the recorded initial set of register values) during reply, to execute in the same manner as they did during the trace.

Finally, the first approach(es) for recording traces can address how to reproduce the values of input memory for deterministic instructions whose inputs depend on memory values by recording into the trace data store 104d the memory values that these instructions consumed (i.e., the reads)—irrespective of how the values that the instructions read were written to memory. In other words, some embodiments include recording only memory reads, but not memory writes. For example, although values may be written to memory by a current thread, by another thread (including the kernel, e.g., as part of processing an interrupt), or by a hardware device (e.g., input/output hardware 105), it is just the values that the thread's instructions read that are needed for full replay of instructions of the thread that performed the reads. This is because it is that values that were read by the thread (and not necessarily all the values that were written to memory) that dictated how the thread executed.

These first approach(es) for recording traces can be implemented fully in software (e.g., as part of a kernel or hypervisor, or as part of a fully-virtualized environment), or can be implemented with the assistance of hardware. For example, they could be implemented by modifications to the processor(s) 102 that assist in determining what to log and/or in actually writing trace data to a trace buffer (e.g., buffer 102e or a reserved portion of the cache(s) 102b) or file.

A second family of approaches for recording bit-accurate traces is built on the recognition that the processor 102 (including the cache(s) 102b) form a semi- or quasi-closed system. For example, once portions of data for a process (i.e., code data and runtime application data) are loaded into the cache(s) 102b, the processor 102 can run by itself—without any input—as a semi- or quasi-closed system for bursts of time. In particular, once the cache(s) 102b are loaded with data, one or more of the processing units 102a execute instructions from the code portion(s) of the cache(s) 102b, using runtime data stored in the data portion(s) of the cache(s) 102b and using the registers 102d. When a processing unit 102a needs some influx of information (e.g., because an instruction it is executing, will execute, or may execute accesses code or runtime data not already in the cache(s) 102b), a "cache miss" occurs and that information is brought into the cache(s) 102b from the system memory 103. For example, if a data cache miss occurs when an executed instruction performs a memory operation at a memory address within the application runtime data 103b, data from that memory address is brought into one of the cache lines of the data portion of the cache(s) 102b. Similarly, if a code cache miss occurs when an instruction performs a memory operation at a memory address application code 103a stored in system memory 103, code from that memory address is brought into one of the cache lines of the code portion(s) of the cache(s) 102b. The processing unit 102a then continues execution using the new information in the cache(s) 102b until new information is again brought into the cache(s) 102b (e.g., due to another cache miss or an un-cached read).

Thus, in the second family of approaches, the tracer 104a can record sufficient data to be able to reproduce the influx of information into the cache(s) 102b as a traced processing unit executes. Four example implementations within this second family of approaches are now described, though it will be appreciated that these are not exhaustive. Since the second approach(es) for recording traces rely closely on operation of the cache(s) 102b, they are typically implemented with hardware assistance. For example, they could be implemented by modifications to the processor(s) 102 that assist in determining what cache events occurred, in determining what to log, and/or in actually writing trace data to a trace buffer (e.g., buffer 102e or a reserved portion of the cache(s) 102b) or file. However, they could also be implemented in a fully virtualized environment (e.g., in which a processor is fully virtualized).

First implementations could record into the trace data store 104d all of the data brought into the cache(s) 102b by logging all cache misses and un-cached reads (i.e., reads from hardware components and un-cacheable memory), along with a time during execution at which each piece of data was brought into the cache(s) 102b (e.g., using a count of instructions executed or some other counter). The effect is to therefore record a log of all the data that was consumed by a traced processing unit 102a during code execution. However, due to alternate execution of plural threads and/or speculative execution, the first implementation(s) could record more data than is strictly necessary to replay execution of the traced code.

Second implementation(s) in the second family of approaches improves on the first implementation(s) by tracking and recording only the cache lines that were "consumed" by each processing unit 102a, and/or tracking and recording only subset(s) of cache lines that are being used by processing units 102a that are participating in tracing—rather than recording all the cache misses. As used herein, a processing unit has "consumed" a cache line when it is aware of the cache line's present value. This could be because the processing unit is the one that wrote the present value of the cache line, or because the processing unit performed a read on the cache line. Some embodiments track consumed cache lines with extensions to one or more of the cache(s) 102b (e.g., additional "logging" or "accounting" bits) that enable the processor 102 to identify, for each cache line, one or more processing units 102a that consumed the cache line. Embodiments can track subset(s) of cache lines that are being used by processing units 102a that are participating in tracing through use of way-locking in associative caches—for example, the processor 102 can devote a subset of ways in each address group of an associative cache to tracked processing units, and log only cache misses relating to those ways.

Third implementation(s) in the second family of approaches could additionally, or alternatively, be built on top a cache coherence protocol (CCP) used by the cache(s) 102b. In particular, the third implementation(s) could us the CCP to determine a subset of the "consumed" cache lines to record into the trace data store 104d, and which will still enable activity of the cache(s) 102b to be reproduced. This approach could operate at a single cache level (e.g., L1) and log influxes of data to that cache level, along with a log of CCP operations at the granularity of the processing unit that caused a given CCP operation. This includes logging which processing unit(s) previously had read and/or write access to a cache line.

Fourth implementation(s) could also utilize CCP data, but operate at two or more cache levels—logging influxes of data to an "upper-level" shared cache (e.g., at an L2 cache), while, using a CCP of at least one "lower-level" cache (e.g., a CCP one more L1 caches) to log a subset of CCP state transitions for each cached memory location (i.e., between sections of "load" operations and sections of "store" operations). The effect is to log less CCP data than the third implementation(s) (i.e., by recording far less CCP state data than the third implementation(s), since the fourth implementation(s) record based on load/store transitions rather than per-processing unit activity). Such logs could be post-processed and augmented to reach the level of detail recorded in the third implementation(s), but may potentially be built into silicon using less costly hardware modifications than the third implementation(s) (e.g., because less CCP data needs to be tracked and recorded by the processor 102).

Fifth implementation(s) could also operate at two or more cache levels. However, rather than logging influxes of data to an upper-level shared cache, as in the fourth implementation(s), the fifth implementation(s) track influxes to a lower-level cache and then leverage knowledge of one or more upper-level caches to determine if, and how, to log the influx. One variant could include processor logic that detects an influx to the lower-level cache, and then checks one or more of the upper-level caches to see if the upper-level cache(s) have knowledge (e.g., accounting bits, CCP data, etc.) that could prevent the influx from being logged or that could enable the influx to be logged by reference to a prior log entry. Then, this variant can log the influx at the lower-layer cache, if necessary, either by value or by reference. Another variant could include processor logic at the lower-level cache that detects the influx, and that sends a logging request to an upper-level cache. The upper-level cache then uses its knowledge (e.g., accounting bits, CCP data, etc.) to determine if and how the influx should be logged (e.g., by value or by reference), and/or to pass the request to another upper-level cache (if appropriate) to repeat the process. The influx is then logged, if appropriate, by an upper-level cache, or by the lower-level cache based on an instruction from an upper-level cache. These fifth implementation(s) could, in some environments, gain many of the benefits of the fourth implementation(s) with fewer hardware modifications.

Regardless of the recording approach used by the tracer 104a, it can record the trace data into the one or more trace data stores 104d. As examples, a trace data store 104d may include one or more trace files, one or more areas of physical memory, one or more areas of a processor cache (e.g., L2 or L3 cache), or any combination or multiple thereof. A trace data store 104d could include one or more trace data streams. In some embodiments, for example, multiple entities (e.g., processes, threads, etc.), could each be traced to a separate trace file or a trace data stream within a given trace file. Alternatively, data packets corresponding to each entity could be tagged such that they are identified as corresponding to that entity. If multiple related entities are being traced (e.g., plural threads of the same process), the trace data for each entity could be traced independently (enabling them to be replayed independently), though any events that are orderable across the entities (e.g., access to shared memory) can be identified with one or more series of sequencing numbers (e.g., monotonically incrementing or decrementing values) that are global across the independent traces. The trace data store 104d can be configured for flexible management, modification, and/or creation of trace data streams. For example, modification of an existing trace data stream could involve modification of an existing trace file, replacement of sections of trace data within an existing file, and/or creation of a new trace file that includes the modifications.

In some implementations, the tracer 104a can continually append to trace data stream(s) such that trace data continually grows during tracing. In other implementations, however, the trace data streams could be implemented as one or more ring buffers. In such implementation, the oldest trace data is removed from the data stream(s) as new trace data is added to the trace data store 104d. As such, when the trace data streams are implemented as buffer(s), they contain a rolling trace of the most recent execution at the traced process(es). Use of ring buffers may enable the tracer 104a to engage in "always on" tracing, even in production systems. In some implementations, tracing can be enabled and disabled at practically any time. As such, whether tracing to a ring buffer or appending to a traditional trace data stream, the trace data could include gaps between periods during which tracing is enabled.

The trace data store 104d can include information that helps facilitate efficient trace replay and searching over the trace data. For example, trace data can include periodic key frames that enable replay of a trace data stream to be commenced from the point of the key frame. Key frames can include, for example, the values of all processor registers 102d needed to resume replay. Trace data could also include memory snapshots (e.g., the values of one or more memory addresses at a given time) reverse lookup data structures (e.g., identifying information in the trace data based on memory addresses as keys), and the like.

Even when using the efficient tracing mechanisms described above, there may be practical limits to the richness of information that can be stored into the trace data store 104d during tracing by the tracer 104a. This may be due to an effort to reduce memory usage, processor usage, and/or input/output bandwidth usage during tracing (i.e., to reduce the impact of tracing on the application(s) being traced), and/or to reduce the amount of trace data generated (i.e., reducing the disk space usage). As such, even though a trace data can include rich information, such as key frames, memory snapshots, and/or reverse lookup data structures, the tracer 104a may limit how frequently this information is recorded to the trace data store 104d, or even omit some of these types of information altogether.

To overcome these limitations, embodiments can include the indexer 104b, which takes the trace data generated by the tracer 104a as input, and which performs transformation(s) to this trace data to improve the performance of consumption of the trace data (or derivatives thereof) by the debugger 104c. For example, the indexer 104b could add key frames, memory snapshots, reverse lookup data structures, etc. The indexer 104b could augment the existing trace data, and/or could generate new trace data containing the new information. The indexer 104b can operate based on a static analysis of the trace data, and/or can perform a runtime analysis (e.g., based on replaying one or more portions of the trace data).

The debugger 104c is usable to consume (e.g., replay) the trace data generated by the tracer 104a into the trace data store 104d, including any derivatives of the trace data that were generated by the indexer 104b (executing at the same, or another, computer system), in order to assist a user in performing debugging actions on the trace data (or derivatives thereof). For example, the debugger 104c could present one or more debugging interfaces (e.g., user interfaces and/or application programming interfaces), replay prior execution of one or more portions of the application 104f, set breakpoints/watchpoints including reverse breakpoints/watchpoints, enable queries/searches over the trace data, etc.

While the tracer 104a, the indexer 104b, and the debugger 104c are depicted (for clarity) as separate entities, it will be appreciated that one or more of these entities could be combined (e.g., as sub-components) into a single entity. For example, a debugging suite could comprise each of the tracer 104a, the indexer 104b, and the debugger 104c. In another example, a tracing suite could include the tracer 104a and the indexer 104b, and a debugging suite could comprise the debugger 104c; alternatively, the tracing suite could include the tracer 104a, and the debugging suite could comprise the indexer 104b and the debugger 104c. Other variations are of course possible.

Notably, the tracer 104a, the indexer 104b, and the debugger 104c need not all exist at the same computer system. For example, a tracing suite could be executed at one or more first computer systems (e.g., a production environment, a testing environment, etc.), while a debugging suite could be executed at one or more second computer systems (e.g., a developer's computer, a distributed computing system that facilitates distributed replay of trace data, etc.). Also, as depicted, the tracer 104a, the indexer 104b, and/or the debugger 104c may each have access the trace data store 104d, either directly or indirectly, regardless of where the tracer 104a, the indexer 104b, the debugger 104c and/or the trace data store 104d actually reside (i.e., as indicated by the solid arrows).

Figure 2:
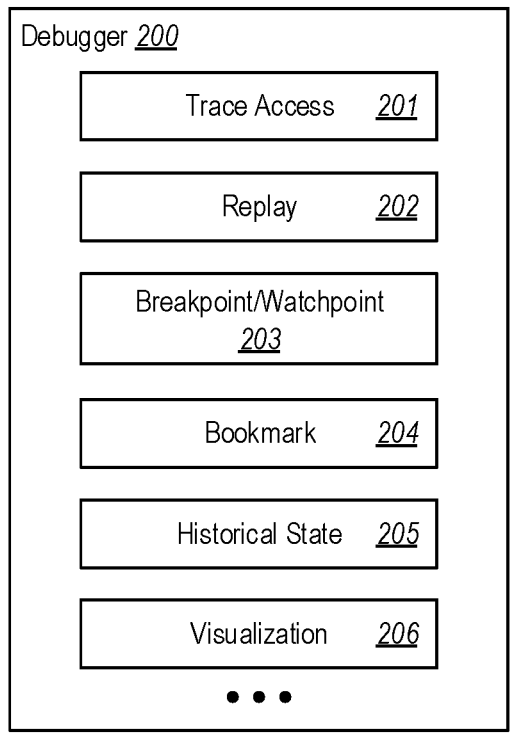
FIG. 2 illustrates example embodiments of a debugger that presents historical state associated with a code element that is part of a prior execution of an entity.

FIG. 2 illustrates example embodiments of a debugger 200, such as debugger 104c of FIG. 1, that presents historical state associated with a code element that is part of a prior execution of an entity. As shown, the debugger 200 can include a plurality of sub-components such as, for example, a trace access component 201, a replay component 202, breakpoint/watchpoint component 203, a bookmark component 204, a historical state component 205, a visualization component 206, etc. While these components are presented as an aide in describing functionality of the debugger 200, it will be appreciated that the particular number and identity of these component can vary, depending on implementation. FIG. 2 is now described in connection with a first example 300 that correlates a timeline 301 of execution of an entity (e.g., application 104f) with a trace data stream 302 representing that execution. In example 300, the timeline 301 could represent an original execution of the entity and the trace data stream 302 could represent trace data recorded by the tracer 104a. Alternatively, example 300, the trace data stream 302 could represent trace data consumed by the debugger, and timeline 301 could represent a replayed execution of the entity.

Figure 3:
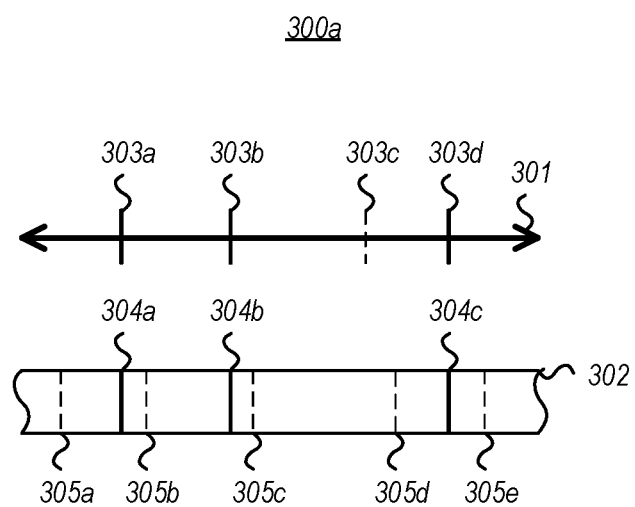
FIG. 3 illustrates an example that correlates a timeline of execution of an entity with a trace data stream representing that execution.
Figure 5:
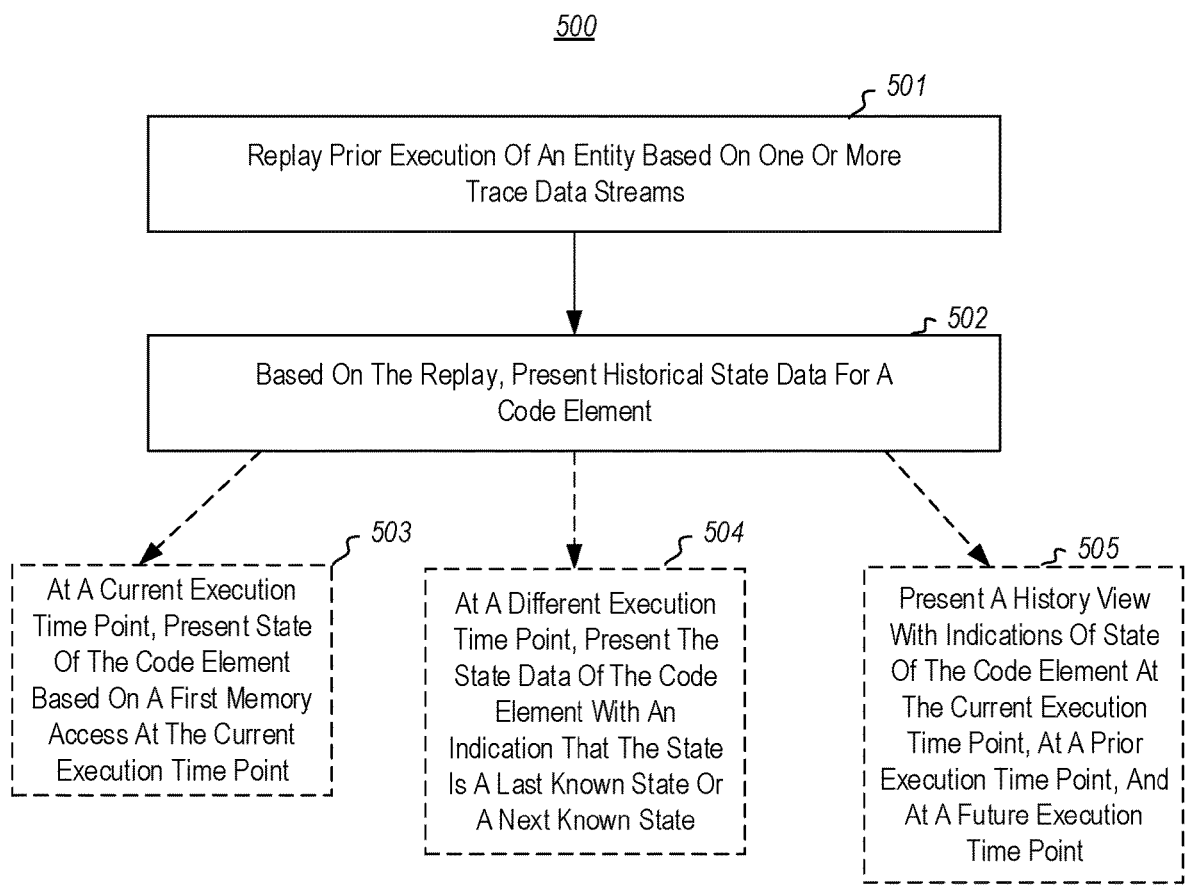
FIG. 5 illustrates a flow chart of an example method for presenting historical state associated with a code element that is part of a prior execution of an entity.

The trace access component 201 accesses trace data stored in the trace data store 104d. Thus, in connection with debugging a prior execution of an entity that is the subject of debugging (e.g., one or more threads associated with a prior execution of application 104f), the trace access component 201 can access one or more trace data streams that capture a bit-accurate trace of the prior execution of the entity. The trace access component 201 could access original trace data streams recorded by the tracer 104a and/or one or more indexed trace data streams indexed by the indexer 104b. For example, referring to FIG. 3, the trace access component 201 could access trace data stream 302 representing one or more threads of execution of a prior execution of application 104f. The trace access component 201 generally accesses trace data streams that include a plurality of key frames that divide each trace data stream into a plurality of independently-replayable segments. Thus, for example, as shown in FIG. 3 the trace data stream 302 includes a plurality of key frames 305a-305e that divide trace data stream 302 into a plurality of independently-replayable segments (i.e., a first segment between key frames 305a and 305b, a second segment between key frames 305b and 305c, and so on.

The replay component 202 replays one or more segments of the prior execution of the entity, based on replaying one or more of the plurality of independently-replayable segments of the trace data stream(s) accessed by the trace access component 201. As such, the replay component 202 can reproduce program execution state at any point in the traced execution of the entity that is the subject of debugging. This state includes, for example, the values of processor registers 102d and the values of memory read from and/or written to (e.g., in the cache(s) 102b). For example, FIG. 3 shows that the replay component 202 could replay the segments of trace data stream 302 to reproduce a timeline 301 of a prior execution of one or more threads of application 104f FIG. 3 shows several example execution time points 303a-303d in the prior execution of a particular thread of application 104f, at which the debugger 200 might pause replay and at which visualization component 206 could present replayed program state at that time point, such as processor registers 102d and memory values.

The breakpoint/watchpoint component 203 enables specification of code and/or data elements in the application 104f which, when encountered or changed by the replay component 202, should cause replay activity by the replay component 202 to be paused/suspended. Breakpoints/watchpoints are typically user-defined (e.g., using a debugger user interface), but they could also be automatically (or semi-automatically) generated (e.g., based on a search or query at the debugger). Thus, for example, the breakpoint/watchpoint component 203 can enable a breakpoint to be set on a particular line in code defining the application 104f; then, when this line of code is encountered by the replay component 202 the breakpoint/watchpoint component 203 can cause replay to pause. In another example, the breakpoint/watchpoint component 203 can enable a watchpoint to be set on a particular variable or data structure; then, when a value of this variable or data structure is changed during replay by the replay component 202 the breakpoint/watchpoint component 203 can cause replay to pause.

The bookmark component 204 enables specification of bookmarks at particular execution time points in the prior execution of the entity. Unlike breakpoint/watchpoints, which are bound to code elements (e.g., lines of code, variables, data structures, etc.) and which will trigger each time the code element is encountered, a bookmark is bound to a particular execution time point. Thus, a bookmark enables a user to quickly jump to different times in the prior execution on application 104f For example, a user might define one or more of execution time points 303a-303d in timeline 301 as bookmarks and jump to those points on timeline 301 using these bookmarks. Like breakpoint/watchpoints, bookmarks are typically user-defined (e.g., using a debugger user interface), but they could also be automatically (or semi-automatically) generated (e.g., based on a search or query at the debugger).

The historical state component 205 uses trace data to identify historical state of one or more code element that are part of a prior execution of an entity. This could include, for example, historical state of relevant code elements at times when replay is paused due to the breakpoint/watchpoint component 203 encountering a breakpoint or watchpoint, or due to the bookmark component 204 jumping to a bookmark. Unlike classic debuggers, which are generally are limited to using information that is gathered while the debugger executes application code "live," the historical state component 205 can leverage the trace data (e.g., contained in trace data stream 302) to identify historical information about past and future values of a given code element at various points in a trace timeline (e.g., timeline 301).

In general, the visualization component 206 presents one or more debugging user interfaces for providing a debugging environment, such as presenting program code, facilitating use of watchpoints/breakpoints, presenting runtime state data, etc. However, in the particular context of the embodiments herein, the visualization component 206 can include unique functionality, enabled by the rich data contained in a time travel trace, for indicating the validity/confidence of presently presented data values, for presenting historical information about past and future values of a given code element (i.e., as identified by the historical state component 205), for providing functionality for setting and navigating bookmarks, etc. The visualization component 206 can present this information using a variety of visualization mechanisms.

Examples of a few possible visualizations mechanisms now given in connection with example user interfaces 400a-400h. In particular, these interfaces 400a-400h demonstrate examples of presenting historical state associated with code elements that are part of a prior execution of an entity and navigating time travel data, and for bookmark functionality. It is understood that user interfaces 400a-400h present only general principles for how various historical state data could be visualized in a user interfaces, and for how bookmark functionality could be implemented, and embodiments are not limited to the particular layouts and implementations shown in user interfaces 400a-400h.

Figure 4A:
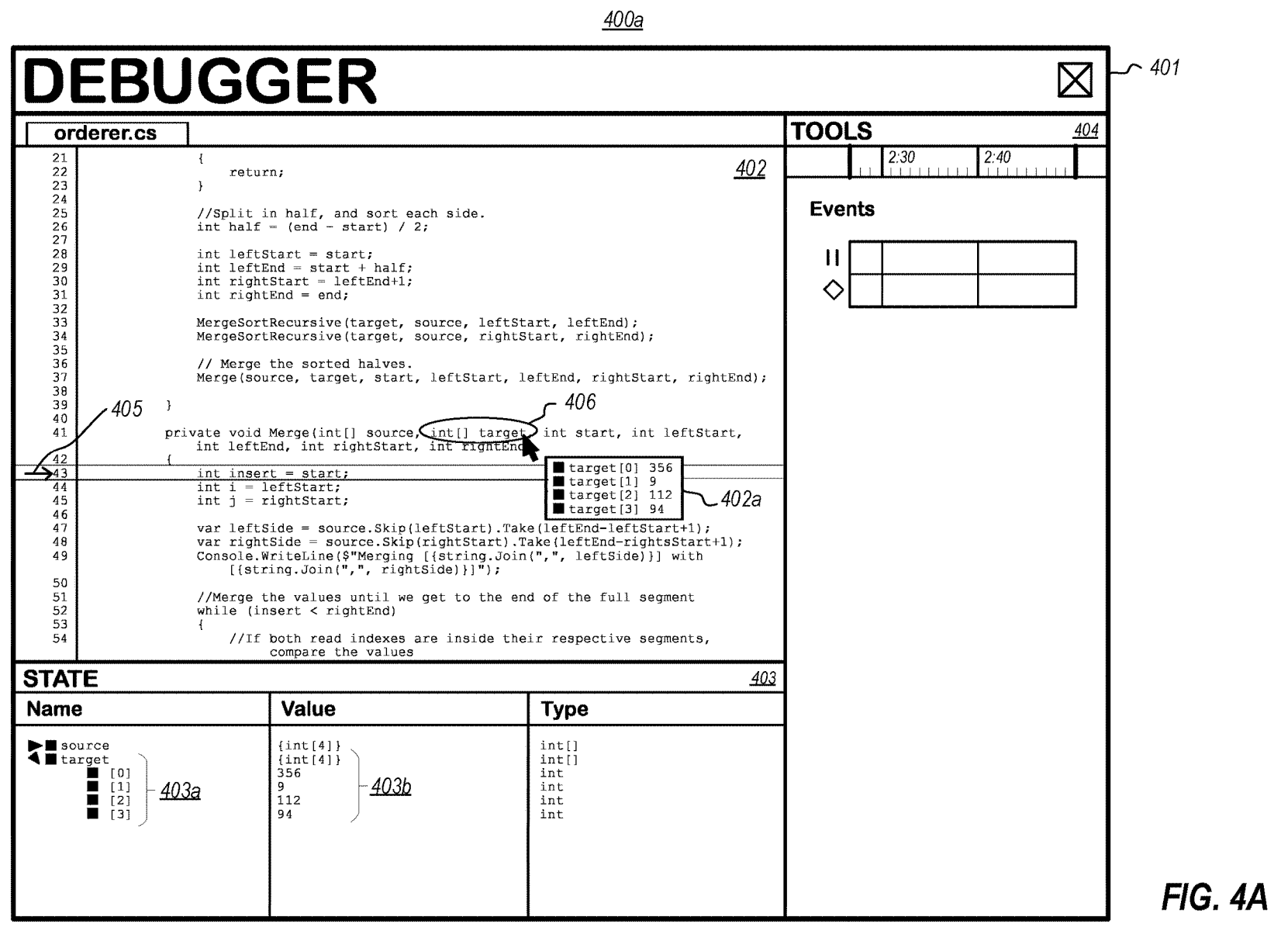

Initially, FIG. 4A illustrates an example user interface 400a showing current state of a code element, in reliance on a trace of execution of an entity to which the code element belongs. In particular, FIG. 4A shows an example debugger window 401 that includes a code pane 402, a state pane 403, and a tools pane 404. As shown by arrow 405, a replayed execution of a traced thread has been paused/suspended at code line 43 in the code that is being debugged, which is the entry of a function (i.e., "Merge") that receives several parameters, including an integer array 406 (i.e., "int[ ] target"). Execution could be paused at entry of this function due to the replay component 202 encountering a breakpoint or a watchpoint, navigation to a bookmark, a code stepping operation (e.g. step forward/backward, step into back/forward, etc.), and the like, while replaying trace data stream 302.

Referring to FIG. 3, this pause at line 43 could correspond, for example, to a pause at execution time point 303b in timeline 301. As shown by a line 304b in trace data stream 302, this point corresponds to a memory access (e.g., a memory read or write) by the thread traced into trace data stream 302. For example, referring to the code pane 402, this memory access 304b could correspond to reading the value(s) of integer array 406 ("int[ ] target") upon entry of the function ("Merge"). As shown, the example user interface 400a can show historical state of this integer array 406 code element during this pause at execution time point 303b. For example, based on the memory access 304b stored in trace data stream 302, the example user interface 400a could show in the state pane 403 the values of the various array elements of integer array 406 (i.e., as indicated at 403a and 403b) as they existed in the thread's memory at execution time point 303b. In another example, based on an interaction with a representation of the integer array 406, the example user interface 400a could show in a popup 402a the values of the various array elements of integer array 406. This popup 402a could be displayed in response to a user interaction with a visual representation of the integer array 406 anywhere in the debugger window 401. In the example shown, for instance, the popup 402a is shown in connection with a mouse, trackpad, keyboard, or touchscreen interaction (e.g., a hover, a selection, a press-and-hold, a click, a click-and-hold, a tap, a gesture, a keypress, etc.) with a representation of the integer array 406 in the code pane 402.

Next, FIGS. 4B and 4C illustrate example user interfaces 400b and 400c showing indication(s) of last known state of a code element, in reliance on a trace of execution of an entity to which the code element belongs. In particular, as shown by arrow 407, in FIG. 4B execution has now been advanced and paused/suspended at line 52 (e.g., due to a forward breakpoint/watchpoint, a bookmark, a forward code stepping operation, etc.), which is a point later in execution of the Merge function. Referring to FIG. 3, this pause at line 52 could correspond, for example, to a pause at execution time point 303c in the timeline 301 of execution of the thread traced into trace data stream 302.

As shown, execution time point 303c is subsequent to execution time point 303b in trace data stream 302 (which corresponds to line 43 as described in connection with FIG. 4A), but prior to a subsequent memory access to integer array 406 (i.e., memory access 304c stored in trace data stream 302 and corresponding to execution time point 303d in the execution timeline 301). As such, as shown in the example user interface 400b, the debugger 104c could show the same historical state of integer array 406 as was shown in FIG. 4A—but could also show one or more indications 408 that that state shown is a "last known state." Example user interface 400c expands on these indications 408, to show a popup 409 that explains that this means that the data shown was read at an earlier time in the entity's execution (i.e., the thread traced into trace data stream 302). The popup 409 could be presented based on an interaction with one or more of the indications 408 (e.g., a mouse, trackpad, keyboard, or touchscreen interaction on an indication 408). Indications 408 can be helpful because, even though the thread traced into trace data stream 302 may not have itself modified the values of integer array 406 after execution time point execution time point 303b, some other entity or memory activity may have. Such activity could be, for example, a write by another thread in the same process (e.g., to a shared variable), a direct memory access (DMA) operation by another entity, a write by a kernel thread, etc. As such, is it may not be known for certain that the values shown are the actual current values at execution time point 303c. Thus, the one or more indications 408 communicate to a user the "best" values that are presently known by the debugger 104c are being presented, but there could be uncertainty as to their accuracy.

While FIGS. 4B and 4C provide examples of indicators that a shown state is a "last known state," it will be appreciated that embodiments can also include similar indicators that a shown state is a "next known state." For example, suppose that after pausing/suspending execution at code line 43/execution time point 303b in FIG. 4A, execution is instead reversed to a prior execution time point in the thread that falls between execution time point 303a and execution time point 303b (e.g., due to a reverse breakpoint/ watchpoint, a bookmark, a reverse code stepping operation, etc.). Similar to FIGS. 4B and 4C, the state pane 403 could present the values of integer array 406 at execution time point 303b; however, since these are the values of a future memory access relative to the current execution time point (i.e., memory access 304b), the debugger 104c could indicate these values are a next known state for the array.

Figure 4D:
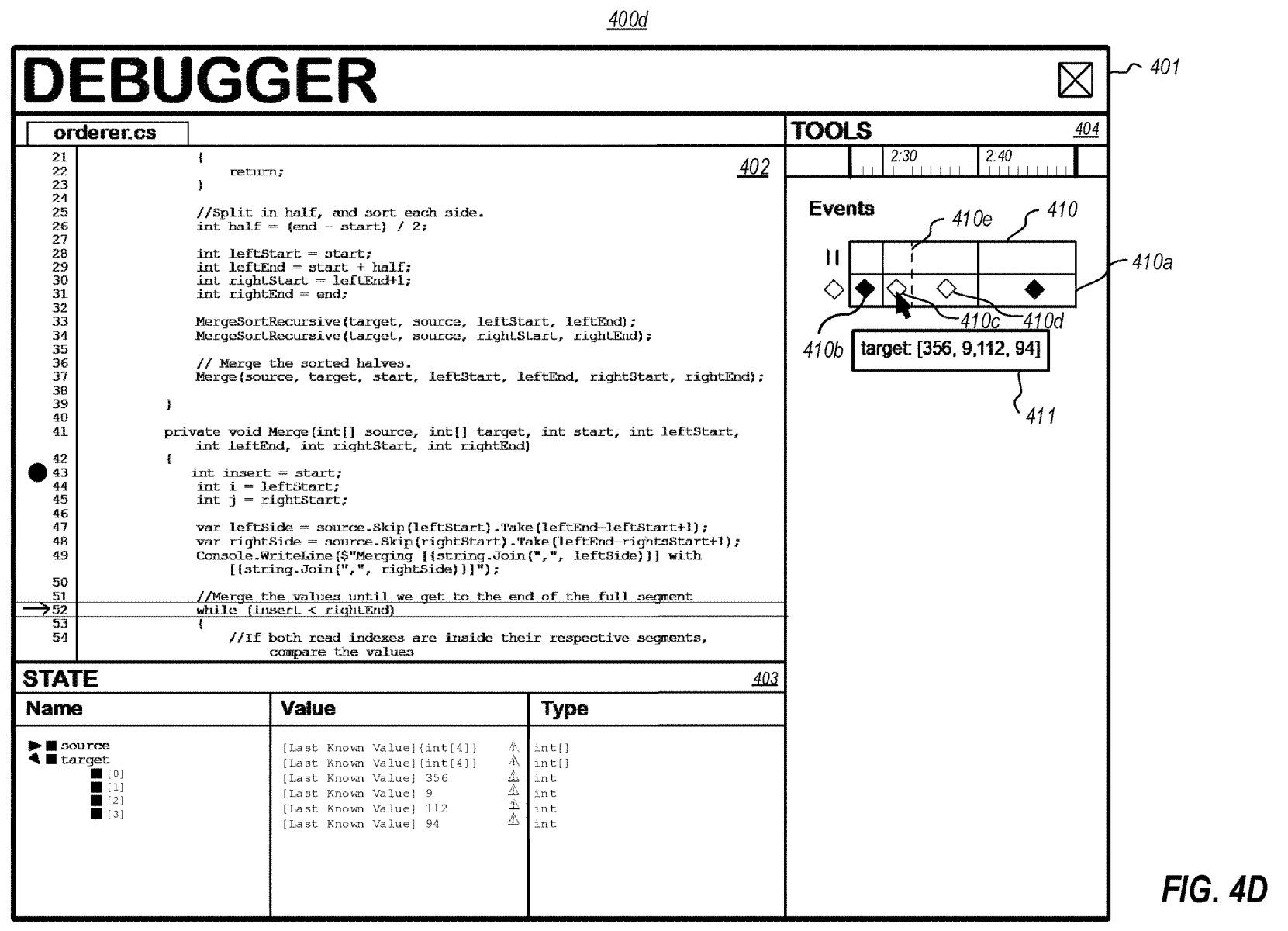

In addition to presenting current and last known values of a code element, as demonstrated in FIGS. 4A-4C, as well as next known values as just described, embodiments may present a more expansive history of values of a code element—including, for example, next known values, last known values, and current known values. To illustrate, the popup 409 of FIG. 4C includes an example "View History" link 409a, which is one example of a user interaction that could cause a history of a subject code element to be presented. FIGS. 4D-4F illustrate example user interfaces 400d-400f showing a history of state of a subject code element, in reliance on a trace of execution of an entity to which the code element belongs. In particular, FIG. 4D shows that a history view 410 in the tools pane 404 now includes a timeline of memory accesses to the subject code element (i.e., integer array 406, "int[ ] target"). In the example, the history view 410 includes a "swimlane" 410a corresponding to integer array 406, and that presents a timeline of memory accesses to the integer array 406. While this example shows a swimlane, it will be appreciated that a variety of timeline visualization types could be used. The example swimlane 410a shows a plurality of memory access indicators (diamonds, in this example) that each correspond to a different memory access to the subject code element that is within the range of the displayed time period. For example, indicator diamond 410b could correspond to memory access 304a recorded in trace data stream 302 (i.e., a prior value), indicator diamond 410c could correspond to memory access 304b (i.e., a current or last known value), and indicator diamond 410d could correspond to memory access 304c (i.e., a next known value).

In some embodiments, these memory access indicators could provide visual cues about the memory access. In the depicted example, for instance, a shaded diamond could represent a memory write, while an unshaded diamond could represent a memory read. It will be appreciated that visual cues could include any combination of memory access indictor shape, color, shading, size, animation, etc. These visual cues could present a many types of information, such as whether the memory access was a read or a write (as demonstrated in the example), whether a value of a memory location changed as a result of the memory access, a number of times a particular memory location has been accessed (e.g., making the indicator bolder or a deeper color with each access), a frequency of access to a particular memory location (e.g., changing a boldness or a deepness of color as access frequency changes), whether the memory access corresponds to triggering of a breakpoint or a watchpoint, a code structure with which the memory access is associated (e.g., different colors for different functions, classes, etc.), and the like.

In addition, some embodiments could present value(s) of the subject code element in connection with user interaction with the memory access indicators shown in swimlane 410a. For example, FIG. 4D shows a popup 411 (e.g., presented in connection with a mouse, trackpad, keyboard, or touchscreen interaction on indicator diamond 410c) that presents the value of the subject code element at trace execution time point corresponding to the memory access. In this example, popup 411 presents the same values of integer array 406 that are shown in the state pane 403—which correspond to the memory access 304b in the trace data stream 302 at execution time point 303b. In another example, FIG. 4E shows a popup 412 (e.g., presented in connection with a mouse, trackpad, keyboard, or touchscreen interaction on indicator diamond 410d) that could present values of integer array 406 that correspond to the memory access 304c in the trace data stream 302 at execution time point 303d.

As shown in FIGS. 4D and 4E, the swimlane 410a could also include a location indicator 410e of the "current" execution time point in the subject entity. For instance, location indicator 410e could correspond to execution time point 303c in the execution timeline 301 of the thread traced into trace data stream 302, at which time code line 52 shown in the code pane 402 is executed (or about to be executed) by the thread. In some embodiments, interaction with the history view 410 can cause the debugger 104c to skip (forwards or backwards) to a selected execution time point in the entity. For example, FIG. 4F shows that interaction with indicator diamond 410d has caused the debugger 104c to skip to execution time point 303d in timeline 301, as indicated by location indicator 410f and arrow 413 at line 71 in the code pane 402. Note that the new values of the integer array 406 at execution time point 303d have also been shown in state pane 403. Some embodiments may apply a visual emphasis (e.g., bolding, underlining, italics, color differences, font differences, etc.) to individual values that have changed since a prior view, as shown at 414 (i.e., the value of array index has changed to 9 from 356).

Figure 4G:
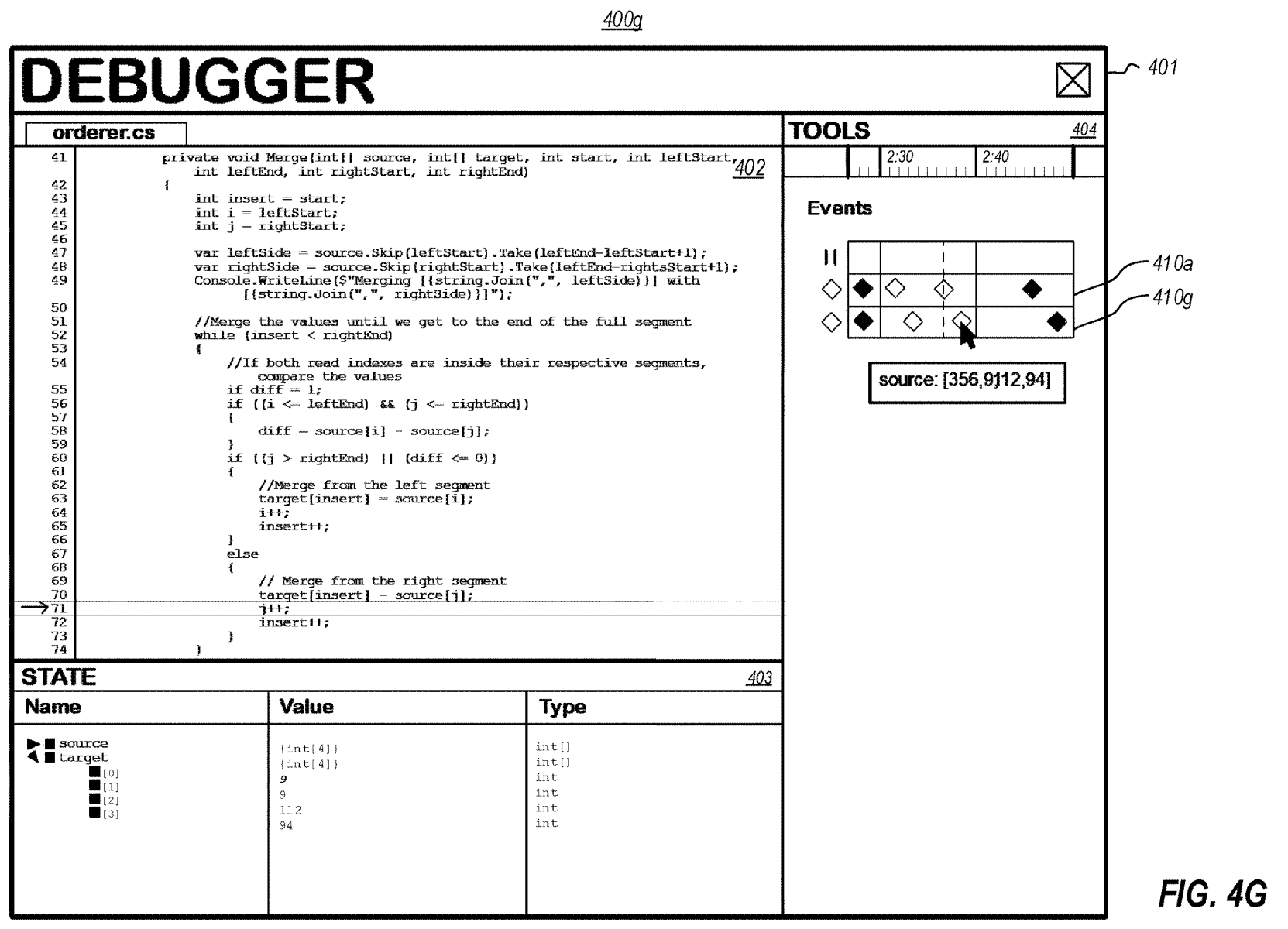

The history view 410 need not be limited to presenting historical state data for a single code element. For example, FIG. 4G illustrates an example user interface 400g showing a history of state of a plurality of code elements, in reliance on a trace of execution of an entity to which the code element belongs. In particular, in addition to swimlane 410a corresponding to target integer array 406, history view 410 now also includes a swimlane 410g corresponding to a source integer array (i.e., "int[ ] source") that was also a parameter to the Merge function at code line 41. Swimlane 410g could be added in a vast variety of manners, such as user interaction with the source integer array in code pane 402 or state pane 403, through an interaction in tools pane 404, etc.

As mentioned, the debugger 104c can include bookmarking functionality (i.e., bookmark component 204). In some embodiments, bookmark functionality could be implemented as part of the history view 410 and/or the code pane 402. For example, FIG. 4H illustrates an example user interface 400h showing bookmarks on a history of state of one or more code elements, in reliance on a trace of execution of an entity to which the code element belongs. In particular, FIG. 4H shows that one or more bookmarks (shown in this example as stars) could be added to any point in history view 410. For example, history view 410 shows a bookmark 410h in the history of the target integer array 406, and a bookmark 410i in the history of the source integer array. The code pane 402 also shows a bookmark symbol 415 corresponding to bookmark 410h. These bookmarks could be added/removed based in interactions in the history view 410 and/or in the code pane 402, and could be navigated to based on user interactions with any of the bookmark indicators.

FIG. 4H also indicates a time scale 416 in the tools pane 404, which corresponds to the passage of time for an entity in the history view 410. This time scale 416 indicates the relative timing of events that occur in execution timeline 301, and could be based on any appropriate time scale such as relative wall clock time between various events, the absolute wall clock time at which events originally occurred, instruction counts between events, processor cycles between events, etc.

Given sufficient richness of trace data, the history view 410 could even represent one or more time periods for which the value(s) of a code element are known to be valid. For example, while the value(s) of a code element are known to be valid at the point of a memory access, some traces could include additional data, such as CCP data and/or cache eviction data, that can be used to determine time period(s) over which these value(s) are known to have remained in a cache line of the cache(s) 102b unchanged. As such, in connection with the memory access indicators, the history view 410 could visually indicate time periods during which it is known for certain that the value is still valid. This could be presented, for example, by way of visual highlights (e.g., shading, colors, etc.) along a swimlane/timeline over which the value associated with a memory access indicator remains valid.

In view of the discussion above of different tracing techniques, it will be appreciated that a trace data stream (e.g., trace data stream 302) could lack trace data for one or more time periods. This could be, for example, because the trace data store 104d stored trace data into a ring buffer, and/or because tracing was disabled for the subject thread during one or more time periods. In some embodiments, the debugger 104c could provide visual indications of these missing periods of trace data. For example, the tools pane 404 could grey out execution time periods that lack trace data in the history view 410 and/or the time scale 416. In another example, the code pane 402 could grey out or deemphasize program code during periods during which its execution is not available in the trace data.

Some embodiments may leverage memory snapshots to enhance the ability of the debugger to provide last and next known values. For example, in some embodiments the tracer 104a could take a memory snapshot before and/or after one or more function calls. In other embodiments, the indexer 104b could add a memory snapshot before and/or after one or more function calls. This enables the debugger 104c to present last/next known values at the beginning and/or end of a function call, even if the code element(s) that are part of the function were not actually involved in a memory access during a particular instance of the function.

In view of the components and data of computing environment 100 of FIG. 1, the example debugger 200 of FIG. 2, the example timeline 301 and trace 302 of FIG. 3, and the example user interfaces 400a-400h of FIGS. 4A-4H, FIG. 5 illustrates a flowchart of an example method 500 for presenting historical state associated with a code element that is part of a prior execution of an entity.

As shown, method 500 can include an act 501 of replaying prior execution of an entity based on one or more trace data streams. In some embodiments, act 501 comprises replaying one or more segments of the prior execution of the entity based on one or more trace data streams storing a trace of the prior execution of the entity. For example, the replay component 202 of debugger 104c/200 can replay one or more segments of trace data stream 302, with segments being be bounded in some implementations by key frames (e.g., 305a-305e), in order to replay at least a portion of a prior execution of an entity such as application 104f.

Method 500 can also include an act 502 of, based on the replay, presenting historical state data for a code element. In some embodiments, act 502 comprises, based on replaying the one or more segments of the prior execution of the entity, presenting historical state associated with the code element. For example, the historical state component 205 could identify historical state of code element(s) of application 104f, and the visualization component 206 could present this historical state, such as in one or more of the manners shown in connection with FIGS. 4A-4H, such as presenting current values in a state pane 403; presenting prior (last known), current, and subsequent (next known) value(s) in a history view 410, presenting value(s) in one or more popups (e.g., 402a, 411, 412), providing one or more indications (e.g., 408, 409) that a presently displayed value is a last known value, etc.

As such, in particular implementations, method 500 could also include one or more of: (i) an act 503 of, at a current execution time point, presenting state of the code element based on a first memory access at the current execution time point; (ii) an act 504 of, at a different execution time point, presenting the state data of the code element with an indication that the state is a last known state or a next known state; or (iii) an act 505 of presenting a history view with indications of state of the code element at the current execution time point, at a prior execution time point, and at a future execution time point. It will be appreciated that method 500 could include each of acts 503-505, or a subset thereof. It will also be appreciated that the presentations of acts 503-505 need not be presented concurrently; indeed, these presentations could be presented serially, one of these presentations could cause another of these presentations to be displayed, one of these presentations could replace another of these presentations, one of these presentations could update another of these presentations, etc. Additionally, method 500 is not limited to the presentations of acts 503-505.

In some embodiments, act 503 comprises, in connection with a first execution time point in the prior execution of the entity, presenting at a user interface a first state of the code element, the first state of the code element being based on a first memory access associated with the code element at the first execution time point. For example, as shown in FIG. 4A, in connection with execution time point 303*b*, the visualization component 206 could present a state pane 403 shows the values of integer array 406 (i.e., 403*a* and 403*b*) and/or the visualization component 206 could present popup 402*a* that shows the values of integer array 406. These values are based on the memory read 304*b* in trace data stream 302 at execution time point 303*b*.

In some embodiments, act 504 comprises, in connection with a different execution time point in the prior execution of the entity, presenting at the user interface the first state of the code element along with an indication that the first state of the code element is at least one of: (i) a last known state, wherein the indication is presented based on the different execution time point being after the first execution time point, but prior to a second memory access associated with the code element at a second execution time point in the prior execution of the entity; or (ii) a next known state, wherein the indication is presented based on the different execution time point being prior to the first execution time point, but after a third memory access associated with the code element at a third execution time point in the prior execution of the entity.

As an example of a next known state, FIG. 4B shows that, in connection with advancing forward to execution time point 303*c*, the visualization component 206 could present state pane 403 that shows the values of integer array 406 (i.e., 403*a* and 403*b*), along with one or more indicators 408 that the value(s) shown are last known values. The displayed values may be based on the memory read 304*b* in trace data stream 302 at execution time point 303*b*. However, the indicators 408 could be shown because the current execution time point (i.e., 303*c*) is after to execution time point 303*b*, but prior to execution time point 303*d* when the next memory access 304*c* occurred. As shown in FIG. 4C, the indicators 408 could be presented in connection with an explanation of the indicators 408, such as popup 409.

As an example of a last known state, in connection with reversing to an execution time that falls between execution time point 303*a* and execution time point 303*b*, the visualization component 206 could present a state pane 403 that shows the values of integer array 406 (i.e., 403*a* and 403*b*), along with one or more indicators that the value(s) shown are next known values. While the values displayed may be based on the memory read 304*b* in trace data stream 302 at execution time point 303*b*, the indicator(s) that the value(s) shown are last known values could be shown because the current execution time point is prior to execution time point 303*b*, but after to execution time point 303*a* when the prior memory access 304*a* occurred.

In some embodiments, act 505 comprises presenting, at the user interface, a history view that includes (i) a first indication that the first state of the code element exists at the first execution time point in the prior execution of the entity; (ii) a second indication that second state of the code element exists at the second execution time point in the prior execution of the entity, the second state of the code element being based on the second memory access associated with the code element at the second execution time point in the prior execution of the entity; and (iii) a third indication that third state of the code element exists at a third execution time point in the prior execution of the entity, the third state of the code element being based on the third memory access associated with the code element at the third execution time point in the prior execution of the entity. For example, as shown in FIGS. 4D-4H, the visualization component 206 could present a history view 410 shows the values of integer array 406 at different points in execution timeline 301. This could include the visualization component 206 presenting (i) indicator diamond 410*c* that corresponds to memory access 304*b* (i.e., a current or known value), (ii) indicator diamond 410*d* the corresponds to memory access 304*c* (i.e., a next or future value); and (iii) indicator diamond 410*b* that corresponds to memory access 304*a* recorded in trace data stream 302 (i.e., a prior or past value).

In some embodiments, the history view 410 is presented in act 505 based on a user interaction associated with the indication that the first state of the code element is the last known state or the next known state. For example, as discussed in connection with FIG. 4C, the history view 410 might be presented based on interaction with a "View History" link 409*a* in popup 409.

In some embodiments, presentation of the history view 410 in act 505 can include one or more of (i) presenting the first state of the code element, based on a first interaction with the first indication, (ii) presenting the second state of the code element, based on a second interaction with the second indication or (iii) presenting the third state of the code element, based on a third interaction with the third indication. For example, as discussed in connection with FIGS. 4D and 4E, values of a code element may be presented based on a user interaction with an indicator diamond (e.g., 410*b*-410*c*), as exemplified by popups 411 and 412.

In some embodiments, presentation of the history view 410 in act 505 includes presenting a timeline view that includes an indication of a current execution time point. For example, for example, as discussed in connection with FIGS. 4D-4F, the history view 410 might include a location indicator (e.g., 410*e*, 4100 that indicates a current execution time point.

In some embodiments, presentation of the history view 410 in act 505 can include one or more of (i) setting a current execution time point to the first execution time point, based on a first interaction with the first indication, (ii) setting the current execution time point to the second execution time point, based on a second interaction with the second indication; or (iii) setting the current execution time point to the third execution time point, based on a third interaction with the third indication. As mentioned, as discussed in connection with FIGS. 4D-4F, the history view 410 might include a location indicator (e.g., 410*e*, 4100 that indicates a current execution time point. Additionally, interaction with the history view 410, such as with indicator diamonds (e.g., 410*b*-410*c*), can cause the current execution time point to be set to an execution time point corresponding the selection (e.g., a selected indicator diamond 410*b*-410*c*).

In some embodiments, presentation of the history view 410 in act 505 includes presenting relative execution times for the first execution time point, the second execution time point, and the third execution time point. For example, as mentioned in connection with FIG. 4H, the tools pane 404 can include a time scale 416 that indicates the relative timing of events that occur in execution timeline 301, and which events are displayed in the examples as indicators diamonds in the history view 410.

In some embodiments, presentation of the history view 410 in act 505 includes presenting a plurality of timelines, a first timeline presenting a history of the code element, and a second timeline presenting a history of another code element. For example, as discussed in connection with FIG. 4G, first historical state of a first code element could be presented in first swimlane 410a (or other timeline visualization), while second historical state of a second code element is presented in second swimlane 410g (or other timeline visualization).

In some embodiments, presentation of the history view 410 in act 505 includes presenting a bookmark which, when selected, sets a current execution time point to an execution time point corresponding to the bookmark. For example, as discussed in connection with FIG. 4H, a history view 410 could include one or more bookmarks (shown in the example as stars) that could be added to any point in history view 410. These bookmarks could be added/removed based in interactions in the history view 410 and/or in the code pane 402, and could be navigated to based on user interactions with any of the bookmark indicators.

The examples of FIGS. 3 and 4A-5A dealt primarily with presenting memory status of a code element based on knowledge of the code element's value at discrete points in time at which the code element was actually accessed (e.g., read) from memory during tracing. With such knowledge, these examples demonstrated that the debugger 104c can indicate whether a displayed memory value is currently known, next known, and/or last known with respect to individual execution time points on a thread. However, in some embodiments, the tracer 104a could write into trace data streams additional information that is usable to determine ranges of execution time, across a single thread and/or across multiple threads, over which a value of a memory location is known to be valid. This enables the debugger 104c to surface additional memory status, such as whether the value of a memory location is unknown, known, previously known, next known, etc. over ranges of execution time for individual threads, and even across threads.

Figure 6:
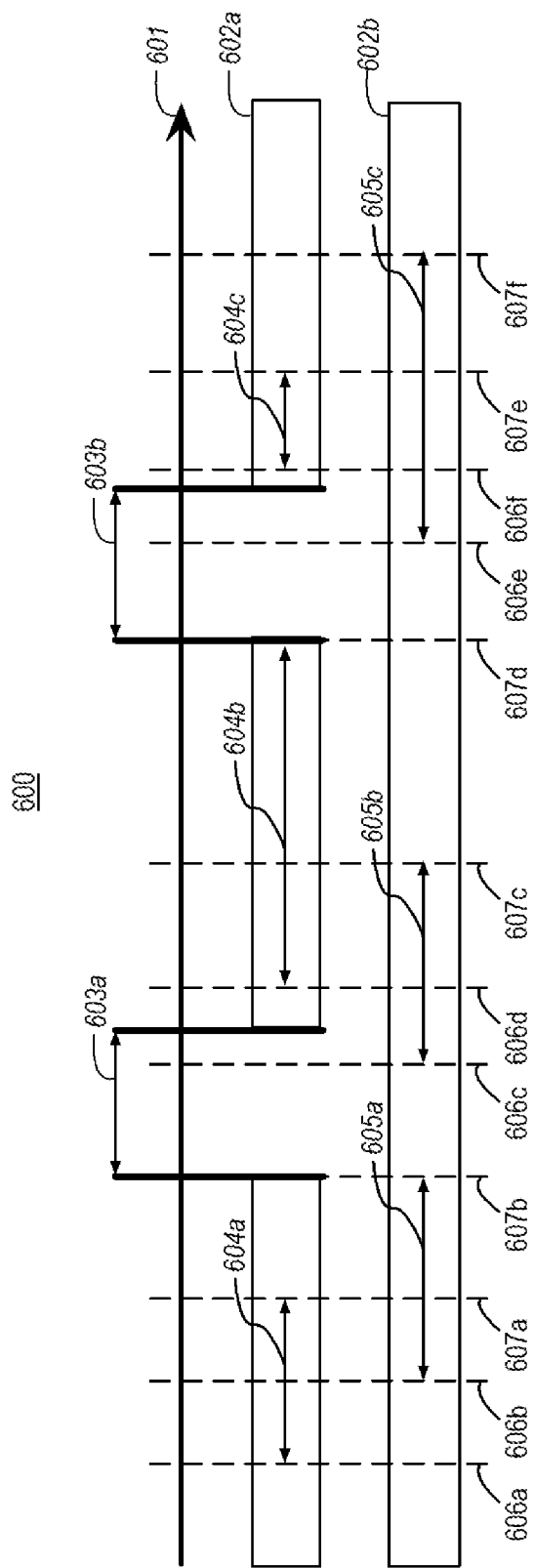
FIG. 6 illustrates an example of traces that include information enabling knowledge of the values of memory location over ranges of execution time.

FIG. 6 illustrates an example 600 of traces that include information enabling knowledge of the values of memory location over ranges of execution time. In particular, similar to FIG. 3, FIG. 6 illustrates an execution timeline 601 and two trace data streams 602 shown along the execution timeline 601. The trace data streams 602 include a first trace data stream 602a corresponding to a first thread and representing a traced execution of the first thread along the execution timeline 601, and a second trace data stream 602b corresponding to a concurrently executing second thread and representing a traced execution of the second thread along the execution timeline 601. These threads could be two threads of the same or related processes, or threads of entirely unrelated processes. Notably, trace data stream 602a includes gaps 603a and 603b during which time tracing was disabled for a first thread. As such, there is an absence of trace data along trace data stream 602a during gaps 603a and 603b.

To simplify introduction of the concepts of traces containing information enabling ranges of memory values to be determined, in example 600 the two trace data streams 602 are assumed to share a common execution timeline 601. As such, in example 600, the timing of the occurrence of a first event in trace data stream 602a is the same as the timing of a second event in data stream 602a at the same point along the execution timeline 601. However, as will be discussed later, in many environments, each trace data stream may be viewed as having its own independent execution timeline. This may be the case when the tracer 104a traces different concurrently executing threads, independently, into different trace data streams. In these traces, it may not be possible to map the timing of every event in one trace data stream to the timing of an event in another trace data stream, even when those trace data streams represent concurrently-executing threads. As such, there can be uncertainty as to when a first event recorded in a first trace data stream occurred with respect to a second event recorded in a second trace data stream.

FIG. 6 also illustrates a plurality of time ranges 604a-604c along trace data stream 602a. Each time range 604 represents a continuous period of execution time along timeline 601 for which a value of a cache line (hence the corresponding memory address) used by the first thread is known. The value of a cache line could be known over a range of time, for example, due to the inclusion of cache evictions in trace data stream 602a, due to the inclusion of certain CCP data in trace data stream 602a, etc. Similarly, FIG. 6 illustrates a plurality of time ranges 605a-605c along trace data stream 602b. Each time range 605 represents a continuous period of execution time along timeline 601 for which a value of a cache line (hence the corresponding memory address) used by the second thread is known. Again, the value of a cache line could be known over a range of time, for example, due to the inclusion of cache evictions in trace data stream 602a, due to the inclusion of certain CCP data in trace data stream 602a, etc.

FIG. 6 also includes a plurality of discrete time points 606a-k and 607a-f along timeline 301. These time points 606a-606f and 607a-607f represent the boundaries of the individual time ranges 604 and 605. For example, time range 604a on trace data stream 602a is bounded by time points 606a and 607a, time range 605a on trace data stream 602b is bounded by time points 606b and 607b, etc. Time points 606 could represent one or more data packets in the trace data streams 602 comprising log data that is usable to determine when the value of a cache location becomes known, while time points 607 could represent one or more data packets in the trace data streams 602 comprising log data that is usable to determine that it is no longer certain that the value of the cache location is known. For example, at time point 606a trace data stream 602a could include trace data indicating that the value of a memory address was read by the first thread, and at time point 607a the trace data stream 602a could include trace data that is usable by the debugger 104c to determine that the value of the memory address can no longer be known for certain. The particular form of this data could vary. For example, the data at time points 606a-606f (i.e., when the value of a cache location becomes known) could include a log of a cache miss, a log of a CCP change of the cache line to exclusive or modified, and the like. The data at time points 607a-607f (i.e., when the value of a cache location is no longer certain) could, for example, include a log of a cache line eviction; a log of a CCP cache line invalidation, the logging of a new memory address replacing (taking) the cache line, etc. (e.g., resulting from DMA, a non-traced write, a write by another thread, speculative execution, etc.); the start of a gap in a trace (e.g., 607b as relates to thread 602a); or it could even be the end of a trace data stream (e.g., time point 607d).

Each time range 604/605 could correspond to knowledge of the same memory address, or knowledge of different memory addresses. For example, each of time ranges 604 could correspond to the same memory address used by the first thread traced into trace data stream 602a (e.g., the same variable used by the thread), or they could correspond to two or more different memory addresses used by the first thread traced into trace data stream 602a (e.g., different variables used by the thread). Similarly, each of time ranges 605 could correspond to the same memory address used by the second thread traced into trace data stream 602a (e.g., the same variable used by the thread), or they could correspond to two or more different memory addresses used by the second thread traced into trace data stream 602a (e.g., different variables used by the thread). In another example, some (all) of time ranges could correspond to a single memory address being accessed by both threads (e.g., memory shared by the first and second threads).

As shown, some of the time ranges 604 on trace data stream 602a overlap in execution time with time ranges 605 on trace data stream 602b. For example, time range 604a overlaps with time range 605a, time range 604b overlaps with time range 605b, and time range 604c overlaps with time range 605c. As such, when using a trace that enables knowledge of ranges of time during which a value is known, it may also be possible to determine when different threads have overlapping knowledge of the same memory locations. For example, if time ranges 604 and 605 all correspond to the same memory address, using the example 600 (in which trace data streams 602 are assumed to share a common execution timeline 601), it could be determined that the two threads both were known to have knowledge of the memory address between time points 606b and 607a, between time points 606d and 607c, and between time points 606f and 607e.

As such, FIG. 6 demonstrates that, given that there is sufficient data in the trace(s) (e.g., CCP events, cache evictions, etc.), it is possible to determine ranges of time over which the value of a cache line/memory address is known. There could be multiple time ranges over which the value of a single cache line/memory address is known, and this knowledge could be extended across threads to the extent that the CCP guarantees data consistency.

Figure 7A:
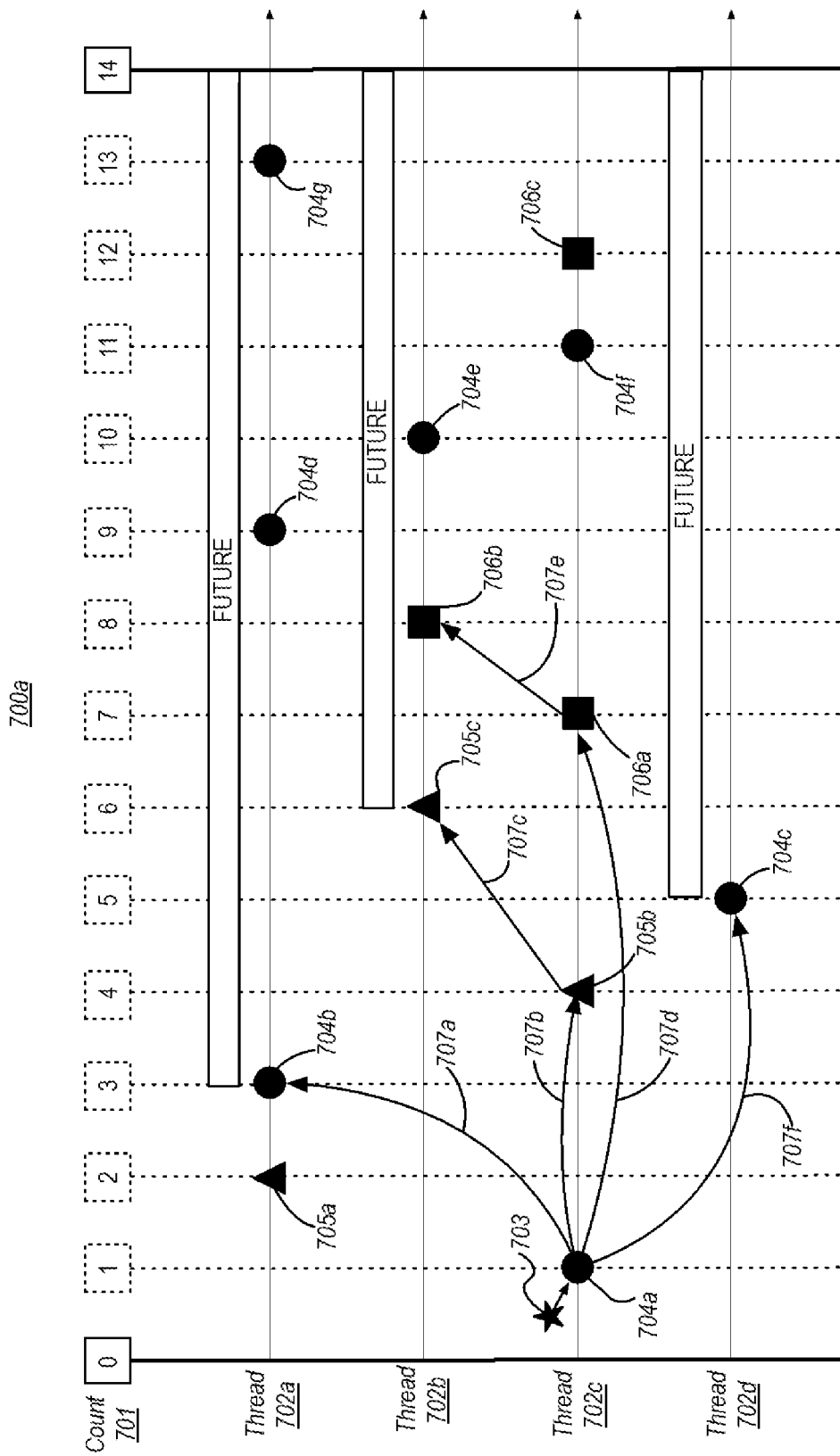
FIG. 7A illustrates an example timing diagram that shows the timing of execution of four threads and events that are in the future on other threads with respect to a reference point on one of the threads.

However, as mentioned, when traces do not share the same execution timeline, as in the simplified example of FIG. 6, there could be uncertainty as to when events occurred on one thread as compared to events on another thread. As such, it could be difficult to identify how one time range (or even a single point) on one trace relates to another time range (or single point) on another trace. To illustrate these concepts, FIGS. 7A-7G provide examples of determining ordering of the timing of events across traces. Starting with FIG. 7A, illustrated is an example timing diagram 700a that shows the timing of execution of four threads 702a-702d, with different time points along each thread's execution denoted by a count 701. While different counts 701 are shown equally spaced, it will be appreciated that this is for simplicity in illustration only, and there could be any amount of time between counts.

In timing diagram 700a, events in a single thread 702 are orderable among each other. In this description, the phrase "same thread" is therefore used as shorthand when explaining that events on the same thread are orderable with respect to each other. To facilitate determinations of a partial ordering of events across threads, timing diagram 700a shows a plurality of series of orderable events 704, 705, and 706. These events, could for example, correspond to data packets placed by the tracer 104a into the traces corresponding to the threads. As mentioned previously, if multiple related entities are being traced, any events that are orderable across the entities can be identified by the tracer 104a with one or more series of sequencing numbers (e.g., monotonically incrementing or decrementing values). In example 700a, there are three different independent series of sequencing numbers— with a first series being represented as circles (i.e., orderable events 704a-704f), a second series represented as triangles (i.e., orderable events 705a-705c), and a third series represented as squares (i.e., orderable events 706a-706c). In timing diagram 700a, orderable events within each series have a global order across the threads with respect to each other; however, an orderable event from one series does not provide ordering with respect to an orderable event from another series. In this description, the phrase "same shape" is used as shorthand when explaining that events within the same shape series are orderable with respect to each other, even across threads. In addition, each thread may be considered to have an implied "start of trace section" at count zero and a corresponding "end of trace section" at count fourteen, which are prior to/after (correspondingly) all other sequencing numbers for the corresponding thread.

Example 700a shows a star 703 on thread 702c which is after thread 702c's start of the trace (C0), and prior to orderable event 704a (a circle) at thread 702c's count 1 (i.e., C1). The star 703 represents a subject execution time point on thread 702c. For example, the star 703 could correspond to a breakpoint or watchpoint encountered by the debugger 104c. The determinations in this example apply to any execution time point between C0 and C1. It is implicitly known that the events on thread 702c from counts C0 to C1 occurred prior to orderable event 704a (same thread), and that the events on thread 702c from counts C1 to C14 occurred subsequent to orderable event 704a (same thread). Therefore, the star 703 has an arrow to the first orderable event in its thread that occurred after the subject execution time point, which is the circle 704a at C1.

Example 700a also shows which portions of the other threads (i.e., threads 702a, 702b, and 702d) are known for certain (based on the orderable events) to have occurred after the events on thread 702c from counts C0 to C1. In other words, example 700a shows which events on threads 702a, 702b, and 702d are, from the perspective of thread 702c, certainly in the future with respect to the subject execution time point represented by the star 703. With respect to thread 702a, for example, timing diagram 700a shows that all of the events on thread 702a from thread 702a's counts 3 to 14 (i.e., A3 to A14) are in the future with respect to the subject execution time point (i.e., C1). As shown by arrow 707a, this is due to the presence of orderable event 704b on thread 702a, which occurs after orderable event 704a on thread 702c, and which is a subsequent event within the "circle" series of orderable events (same shape). With respect to thread 702b, timing diagram 700a shows that all of the events on thread 702b from counts B6 to B14 are in the future with respect to the subject execution time point (i.e., C1). As shown by arrows 707b and 707c, this is due to the presence of orderable events 705b and 705c in the "triangle" series of orderable events (same shape). Arrow 707b shows that orderable event 705b is orderable against orderable event 702c (same thread). Then, arrow 707c shows that orderable event 705c on thread 702b is known to be after orderable event 705b on thread 702c (same shape). As shown, a similar path through arrows 707d and 707e could be taken through orderable events 706a and 706b in the "square" series of orderable events. As such, events B8-B14 could be identified as being in the future based on this path, though this overlaps with the B6 to B14 events identified using the triangle series of orderable events. With respect to thread 702d, timing diagram 700a shows that all of the events on thread 702d from counts D5 to D14 are in the future with respect to the subject execution time point (i.e., C1). As shown by arrow 707f, this is due to the presence of orderable events 704c in the "circle" series of events.

Figure 7B:
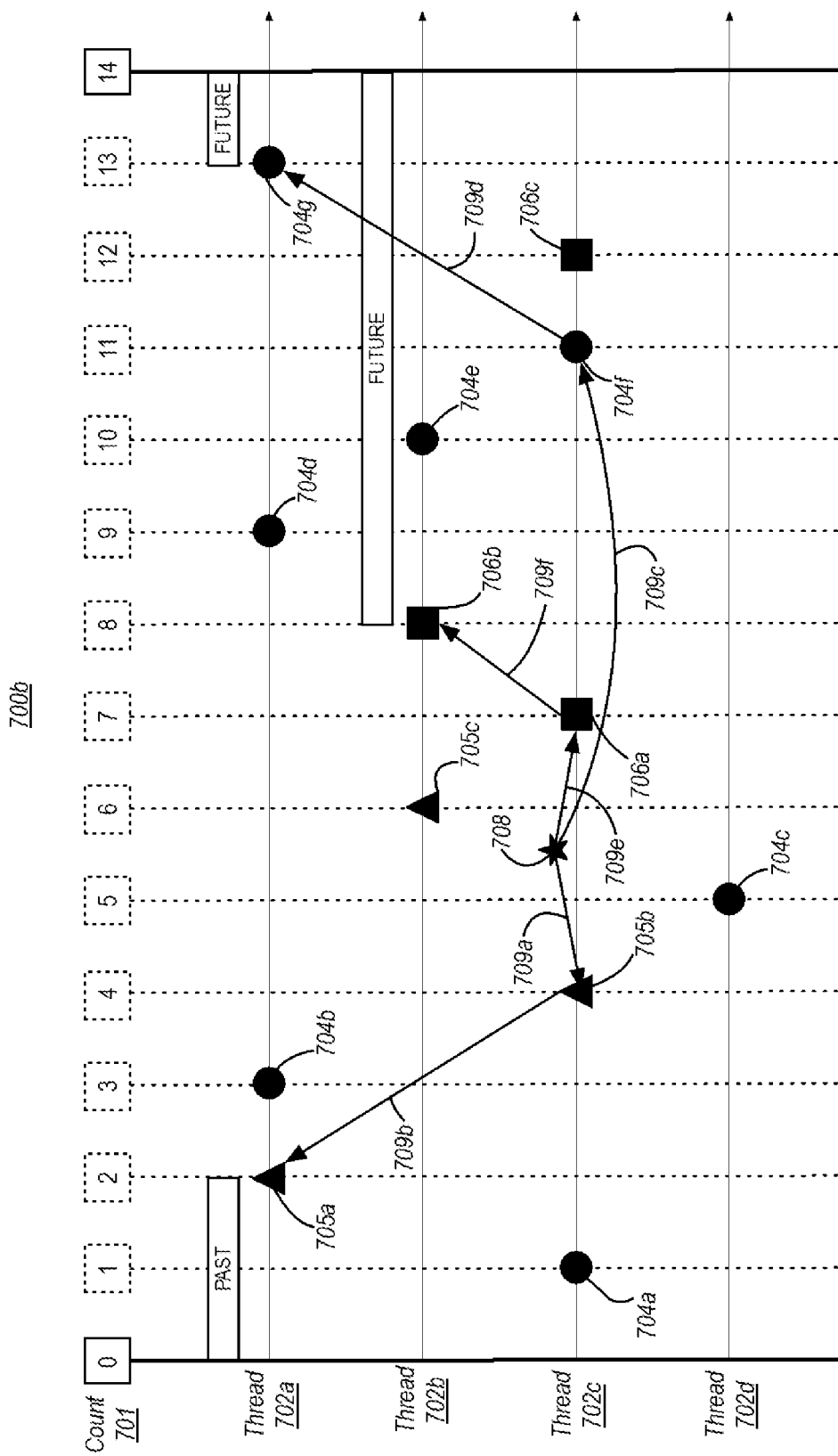
FIG. 7B illustrates an example timing diagram that shows the timing of execution of four threads and events that are in the past and in the future on other threads with respect to a reference point on one of the threads.

FIG. 7B illustrates another example timing diagram 700b that also shows the timing of execution threads 702a-702d, and that also includes orderable events 704, 705, and 706. However, this time there is a star 708 later in thread 702c, indicating that the subject execution time point on thread 702c is now sometime between counts C4 and C7 (i.e., rather than somewhere between counts C0 and C1, as in FIG. 7A). FIG. 7B shows that, using these same orderable events, it is possible to determine ranges of events on other threads that occurred both in the past and in the future with respect to this new subject execution time point at star 708.

With respect to thread 702a, for example, timing diagram 700b shows that the events on thread 702a from counts A0 to A2 are in the past with respect to the subject execution time point on thread 702c at star 708. For example, arrow 709a shows that orderable event 705b on thread 702c occurred prior to the subject execution time point (same thread), and arrow 709b shows that orderable event 705a on thread 702a occurred prior to orderable event 705b (same shape); the events from counts A0 to A2 on thread 702a are prior to orderable event 705a (same thread) and are thus prior to the subject execution time point. Timing diagram 700b also shows that the events on thread 702a from counts A13 to A14 are in the future with respect to the subject execution time point. For example, arrow 709c shows that orderable event 704f on thread 702c occurred after the execution time point (same thread), and arrow 709d shows that orderable event 704g on thread 702a occurred after orderable event 704f (same shape); the events from counts A13 to A14 on thread 702a are after orderable event 704g (same thread) and are thus after the subject execution time point.

With respect to thread 702b, timing diagram 700b shows that the events on thread 702b from counts B8 to B14 are in the future with respect to the subject execution time point on thread 102c at star 708. For example, arrow 709e shows that orderable event 706a on thread 702c occurred after the execution time point (same thread), and arrow 709f shows that orderable event 706b on thread 702b occurred after orderable event 706a (same shape); the events from counts B8 to B14 on thread 702b are after orderable event 706b (same thread) and are thus after the subject execution time point. Notably, timing diagram 700b lacks sufficient information to identify events on thread 702d that are in the past or future with respect to the subject execution time point at star 708.

Figure 7C:
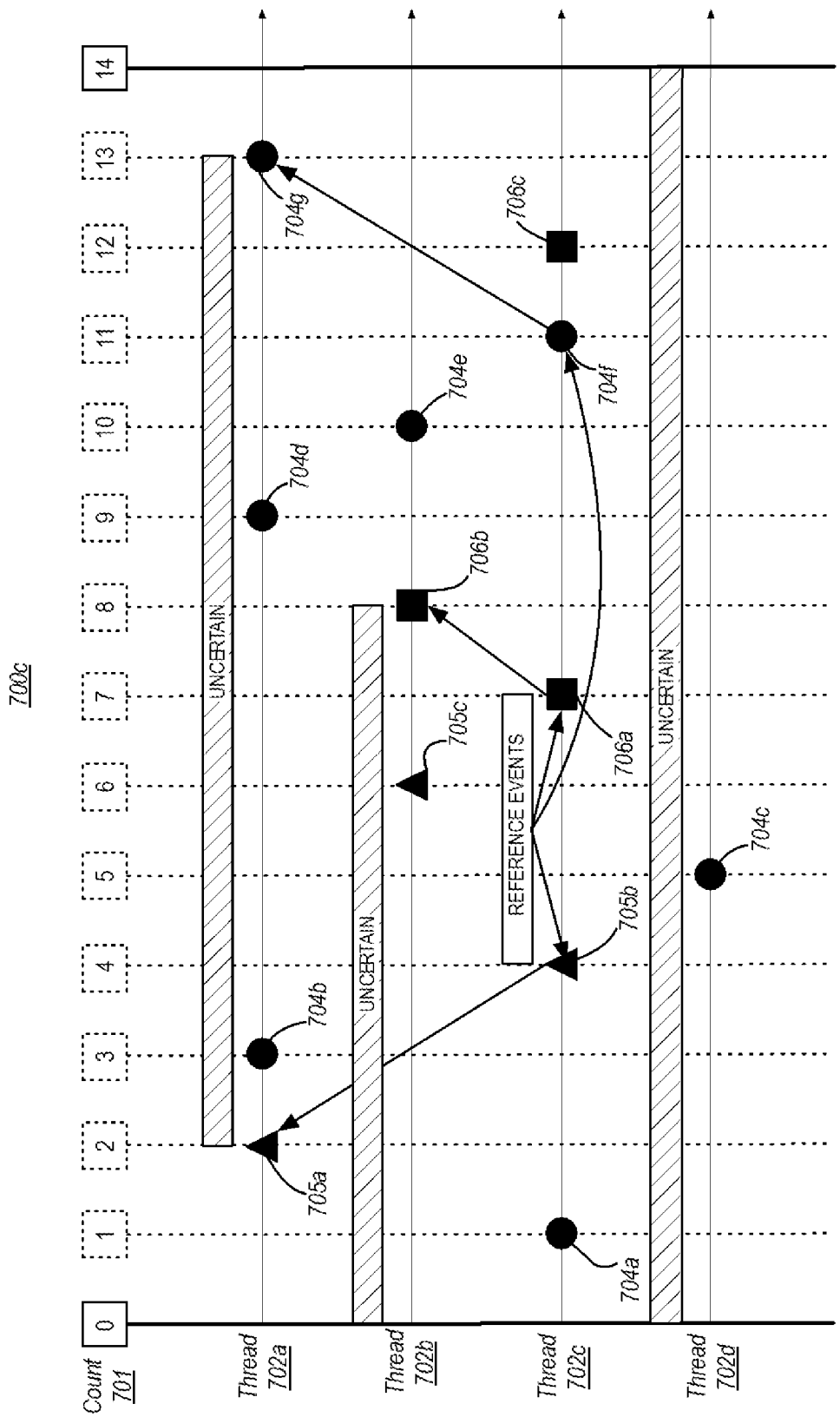
FIG. 7C illustrates an example timing diagram that shows regions of uncertainty in relation to FIG. 7B.

While FIG. 7B illustrated ranges where there is certainty as to whether certain events on threads 702a and 702b occurred prior to, or after, the subject execution time point on thread 702c (i.e., at star 708), FIG. 7C illustrates another example timing diagram 700c that shows where there is uncertainty as to relative ordering of different events between threads. In some ways, timing diagram 700c could view viewed as an inverse of timing diagram 700b. In particular, timing diagram 700c shows which ranges of events on threads 702a, 702b, and 702d had an ordering that is uncertain with respect to range of "reference events" that occur between counts C4 to C7 on thread 702c. These reference events would include the event corresponding to star 708, which appeared between orderable events 705b and 706a. Since orderable events 705b and 706a were the basis for determining the "past" and "future" blocks in timing diagram 700b, the areas of uncertainty in threads 702a, 702b, and 702c that are shown in timing diagram 700c are applicable any of the instructions between orderable events 705b and 706a, hence the designation of any of these events as "reference events." As mentioned, timing diagram 700c is somewhat an inverse of timing diagram 700b, and thus the regions of uncertainty shown could be derived from the analysis discussed in connection with FIG. 7B. However, the regions of uncertainty could alternatively be identified directly based on the same orderable events. For example, in reference to thread 702a, the region of uncertainty from counts A2 to A13 could be identified based on paths to these end points. For example, the end point at count A2 could be identified based on the illustrated path through orderable events 705b and 705a. The end point at count A13 could be identified based on the illustrated path through orderable events 704f and 704g or based on a path from orderable event 706a to 706b (same shape), from orderable event 706b to 704e (same thread), and then from orderable event 704e to 704g (same shape).

Figure 7D:
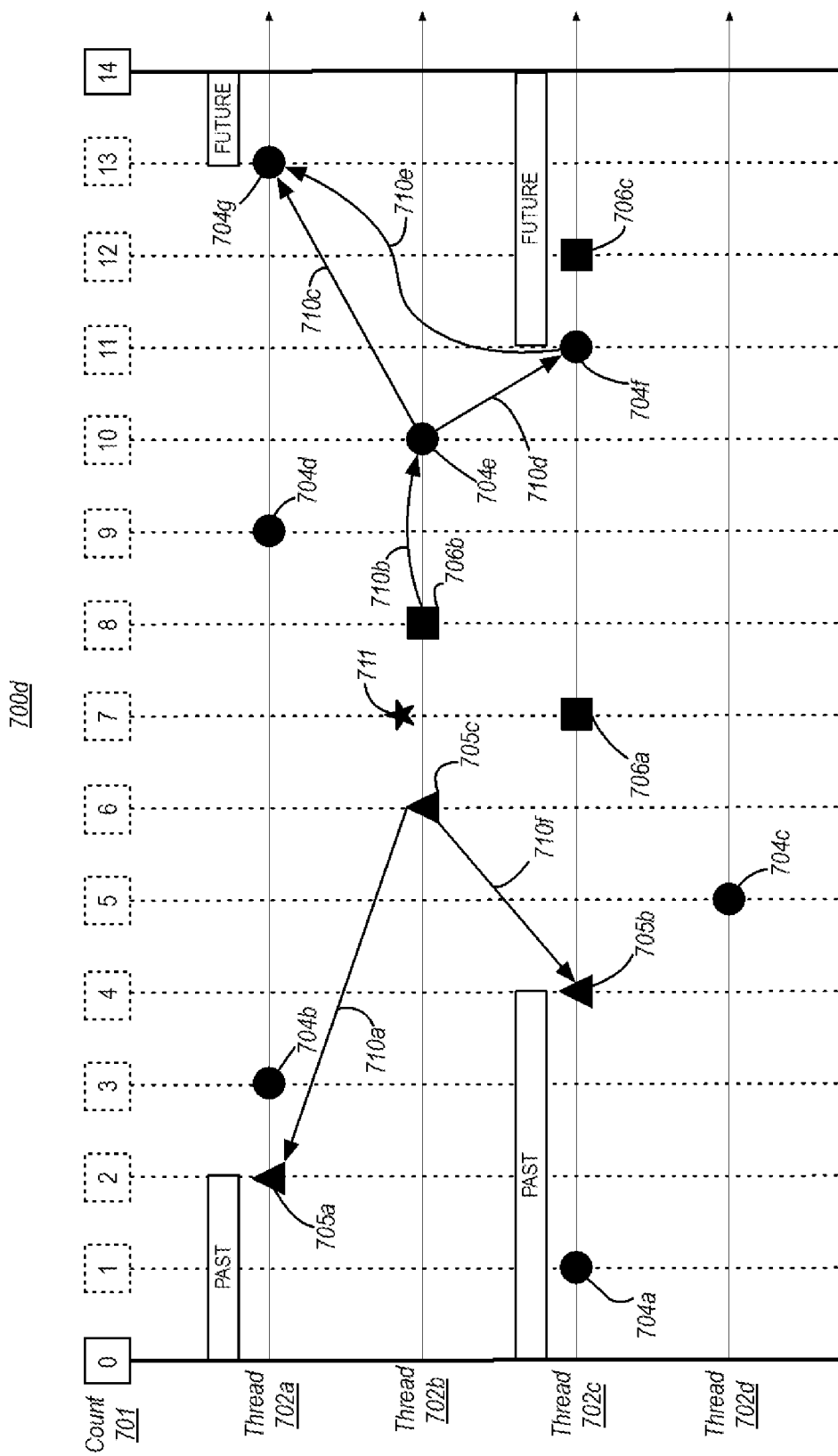
FIG. 7D illustrates an example timing diagram that shows the timing of execution of four threads and events that are in the past and in the future on other threads with respect to a reference point on one of the threads.

In yet another example, FIG. 7D illustrates an example timing diagram 700d that again shows the timing of execution threads 702a-702d, and that again includes orderable events 704, 705, and 706. However, this time there is a star 711 on thread 702b indicating that the subject execution time point is now on thread 702b, and that it is sometime between counts B6 and B8.

With respect to thread 702a, FIG. 7D shows that the events from counts A0 to A2 are in the past from the perspective of the subject execution time point at star 711. This is because the triangle orderable event 705c is prior to the subject event at star 711 on thread 702b, and because the triangle orderable event 705a on thread 702a is prior to the triangle orderable event 705c (see arrow 710a). FIG. 7D also shows that the events from counts A13 to A14 are in the future from the perspective of the subject execution time point at star 711. This is because the square orderable event 706b is after the subject event at star 711 on thread 702b, because the circle orderable event 704e is after orderable event 706b on thread 702b (see arrow 710b), and either (i) because the circle orderable event 704g on thread 702a is after orderable event 704e (see arrow 710c), or (ii) because the circle orderable event 704f on thread 702c is after orderable event 704e on thread 702c (see arrow 710d) and the circle orderable event 704g on thread 702a is after orderable event 704f (see arrow 710e).

With respect to thread 702c, FIG. 7D shows that the events from counts C0 to C4 are in the past from the perspective of the subject execution time point at star 711. This is because the triangle orderable event 705c is prior to the subject event at star 711 on thread 702b, and because the triangle orderable event 705b on thread 702c is prior to orderable event 705c (see arrow 710f). FIG. 7D also shows that the events from counts C11 to C14 are in the future from the perspective of the subject execution time point at star 711. This is because the square orderable event 706b is after the subject event at star 711 on thread 702b, because the circle orderable event 704e is after orderable event 706b on thread 702b (see arrow 710b), and because the circle orderable event 704f on thread 702c is after orderable event 704e (see arrow 710d).

Figure 7E:
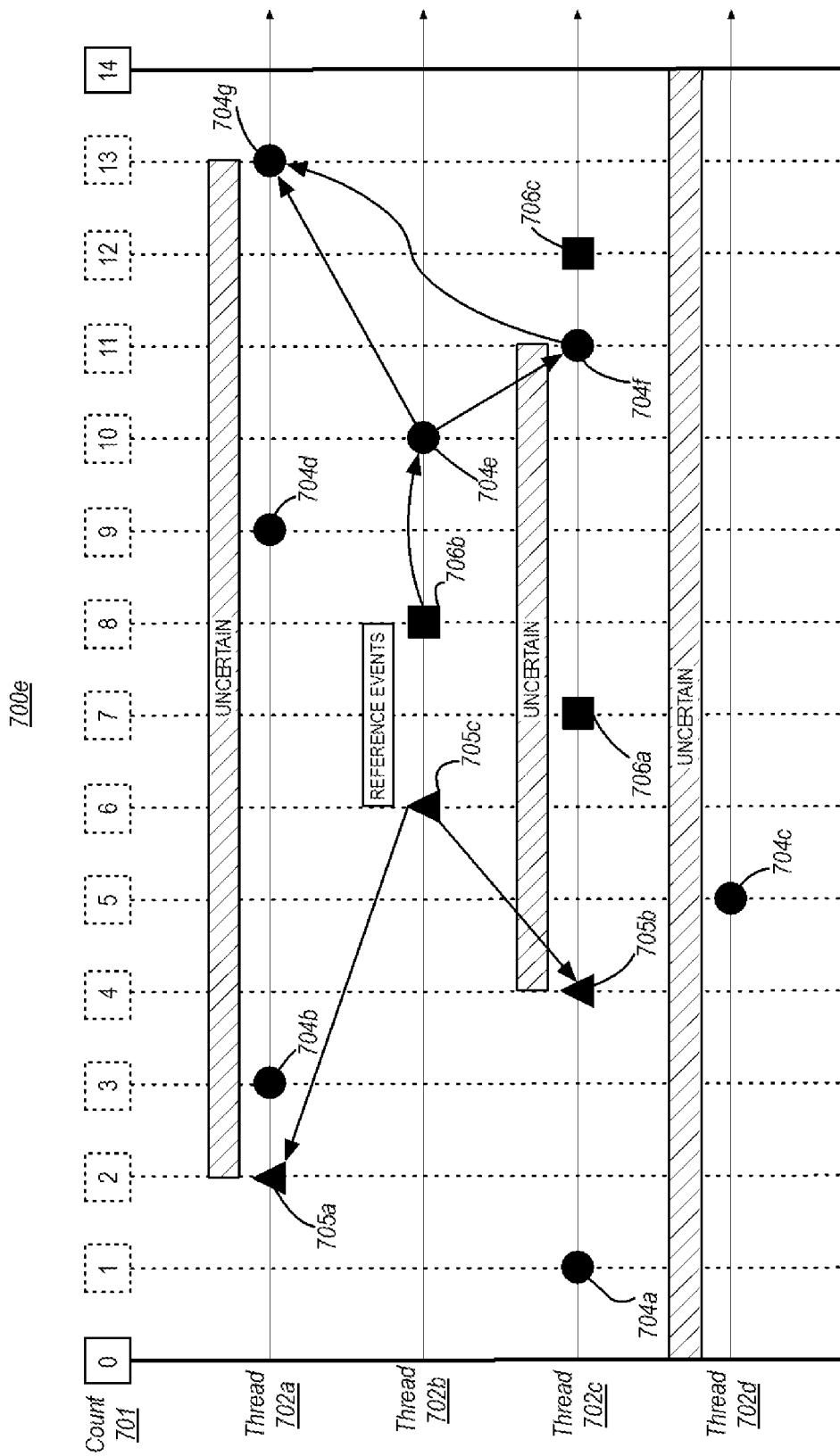
FIG. 7E illustrates an example timing diagram that shows regions of uncertainty in relation to FIG. 7D.

Just as FIG. 7C related to FIG. 7B, and just as it illustrated where there is uncertainty as to relative ordering of different events between threads, FIG. 7E relates to FIG. 7D, and it illustrates a timing diagram 700e that similarly shows regions of uncertainty with respect to reference events. Again, timing diagram 700d could view viewed as an inverse of timing diagram 700e. In particular, timing diagram 700e shows which ranges of events on threads 702a, 702c, and 702d had an ordering that is uncertain with respect to the range of "reference events" that occurred between counts B6 to B8 on thread 702b.

Figure 10A:
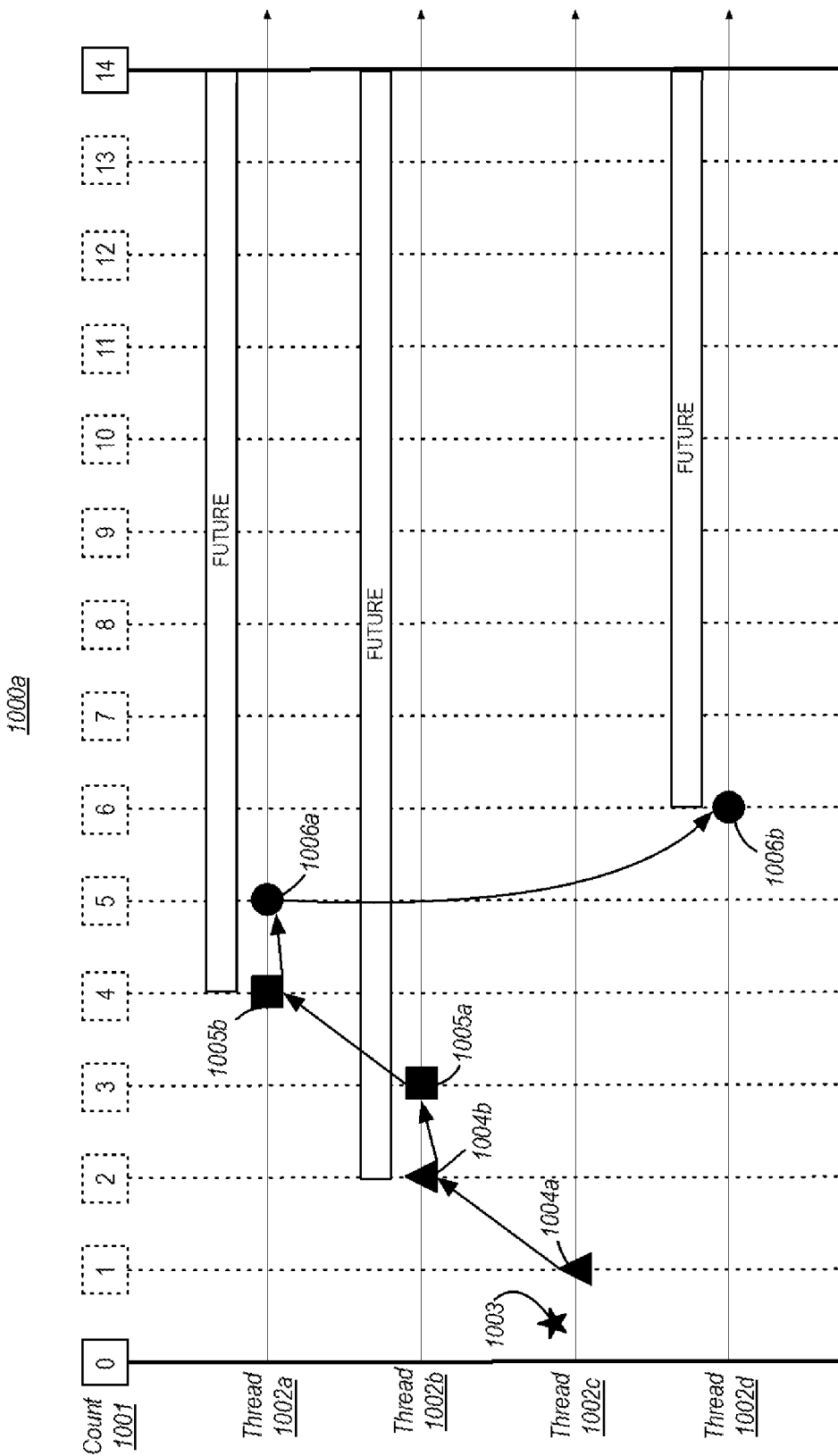
FIG. 10A illustrates an example timing diagram that shows the timing of execution of four threads and events that are in the future on other threads with respect to a reference point on one of the threads.

In each of the foregoing examples, the subject thread and threads for which there are past/future events identified share orderable events from the same series. However, embodiments can also identify past/future events on other threads, even when the threads don't share orderable events from the same series. To demonstrate these concepts, FIG. 10A illustrates an example timing diagram 1000a that shows a subject execution time point between C0 and C1 on thread 1002c (i.e., star 1003), and three series of orderable events: 1004a and 1004b (triangles), 1005a and 1005b (squares), and 1006a and 1006b (circles). Notably, thread 1002c only includes orderable events from the triangle series (i.e., orderable event 1004a), and that threads 1002a and 1002d lack any orderable event from this series; nonetheless, it is still possible to determine future events on threads 1002a and 1002d with respect to the subject execution time point at star 1003. For example, the events on thread 1002a from counts A4 to A14 are known to be in the future based on the triangle orderable event 1004a on thread 1002c being prior to triangle orderable event 1004b on thread 1002b, based on orderable event 1004b being prior to the square orderable event 1005a on thread 1002b, and based on orderable event 1005a being prior to the square orderable event 1005b1005b on thread 1002a. Note that orderable event 1005b is in the square series, that there are no square series orderable events on thread 1002c, but that there is continuity between the triangle series and the square series on thread 1002b, enabling the future events on thread 1002a to be identified. Continuing this chain of continuity also leads to identifying events in the future on thread 1002d (i.e., the events from counts D6 to D14), which also lacks any triangle orderable events. This is based on the circle orderable event 10031006a on thread 1002a being after orderable event 1005b, and based on the circle orderable event 10031006b on thread 1002d being after orderable event 10031006a. As shown, the events on thread 1002b from counts B2 to B14 are identified as being future events with respect to star 1003 based on orderable event 1004b.

Similar to FIGS. 7C and 7E, FIG. 10B shows an execution timeline 1000b that shows which events on threads 1002a, 1002b, and 1002d have an uncertain ordering with respect to the events between counts C0 and C1 on thread 1002c (which includes the subject execution time that was indicated by star 1003).

FIG. 6 demonstrated that it is possible, given that there is sufficient trace data, to determine ranges of time over which the value of a cache line is known. This can be respect to a single thread, or multiple threads. FIGS. 7A-7E and FIGS. 10A and 10B then demonstrated that there can be uncertainty as to when, from the perspective of a particular execution time point on a given thread, other event(s) happened on one or more other threads. It will be appreciated that these two concepts can be used separately, or in combination, by the debugger 104a to present rich information about memory values. For example, in the tools pane 404 could provide a variety of visualizations highlighting ranges (in a single thread or in multiple threads) over which the value of a subject code element is known, highlighting ranges over which the order of execution of instructions in other threads is known with respect to a current breakpoint/watchpoint, indicating when a displayed value in another thread has an unknown timing relation to a current breakpoint/watchpoint, etc.

In some embodiments, a subject code element could be a function that executes logic, that calls one or more other functions (referred to herein as internal functions) and/or that relies on one or more other variables (referred to herein as internal variables). In these cases, a "value" of the subject code element (i.e., for display in the state pane 403 and/or the tools pane 404) could be, for example, the return value obtained by evaluating the function. If the function was actually executed during tracing by the tracer 104a, this value could be obtained from the trace either directly (e.g., as a memory value stored in the trace) or by replaying one or more portions of the trace (e.g., including logic of the function, replaying one or more internal functions, initializing or computing one or more internal values, etc.) in reliance on trace data.

However, there could be circumstances in which it is desirable to obtain a function's return value when it did not actually execute during tracing, when it is desirable to cause the function to execute in a manner different than it did during tracing, or when it is desirable to evaluate a function at a time other than when it executed during tracing. For example, the function could be a "property getter" function, which are common in managed languages such as C#. In this example, the function could correspond to a property getter function that can be used to obtain attributes of a current user interface window from the runtime, but which did not actually execute by the subject thread during tracing. In another example, the function could be a typical function (whether that be in a managed language or not), but a user may be able to cause it to execute differently during debugging (e.g., by altering its input parameters). In either case, evaluation of such a function may involve executing functions (on this thread or another thread) and/or accessing memory locations (on this thread or another thread) that were not executed or accessed during creation of the trace.

Notably, such a function could access one or more functions and/or values in the same thread of the function, and/or it could access one or more functions and/or values available on other thread's traces (e.g., traces of a managed runtime). For example, FIG. 8A illustrates an example 800a of evaluating a function, such as a property getter, during trace replay and debugging. Example 800a shows an execution timeline that represents a combination of the execution timelines 700d and 700e of FIGS. 7D and 7E, and that shows the areas on threads 802a, 802c, and 802d that are in the past, in the future, or uncertain with respect to the reference events on thread 802b. Among these reference events there is a star 803, which represents a subject execution time point on thread 802b. As shown by the arrows 804a-804d, the function (which may, or may not, have executed during tracing) accesses several values that are known on threads 802a and 802c, either in the future or in the past with respect to the execution time point on thread 802b denoted by the star 803.

Given this information, the debugger 104c could present in the debugger window 401 not only the evaluated value of the function as it executed or would have executed at star 803, but also any "covered" values of the internal variables and/or internal functions that are relied upon by the function. If the function did not actually execute during tracing (as may be common for property getters), the debugger 104c could simulate execution of the function at the subject execution time point. Simulation of execution of the function would include the debugger 104c attempting to execute the function's code in reliance on data that is available on the trace (if it is available). If a function relies on "internal" functions, these debugger 104c could also simulate execution of these internal functions. Note that when dealing with managed languages, if any of these functions (i.e., the subject function and/or an "inner" function) did not execute during tracing, the trace may lack "just in time" compiled (jitted) code for the function (i.e., code containing native instructions that were just in time compiled from intermediate language (IL) instructions). If this is the case, simulation of execution of a function (including internal functions) could involve one or more of: (i) executing IL instructions for un-jitted code, (ii) executing IL instructions for un-jitted code and executing native instructions for jutted code, or (iii) jutting the IL instructions of un-jitted code to create native instructions and then executing these native instructions.

Whether the function actually executed, or whether its execution is simulated by the debugger 104c, for each "covered" value, the debugger window 401 could present an indication (e.g., in the state pane and/or in the tools pane 404) whether these values are from the future (e.g., next known), are from the past (e.g., last known), are current value, etc. with respect to the subject execution time point. If the function already executed during tracing, the debugger 104c might simply obtain the value(s) from the appropriate trace(s) 802. If there is insufficient data on the trace(s) 802 to simulate execution of the function, the debugger 104c could display in the debugger window 401 the value(s) that were able to be obtained from the trace(s) and/or indicate which value(s) that could not be obtained. Additionally, or alternatively, the debugger 104 could visualize the relative timing memory accesses corresponding to these values (e.g., in tools pane 404).

Figure 8B:
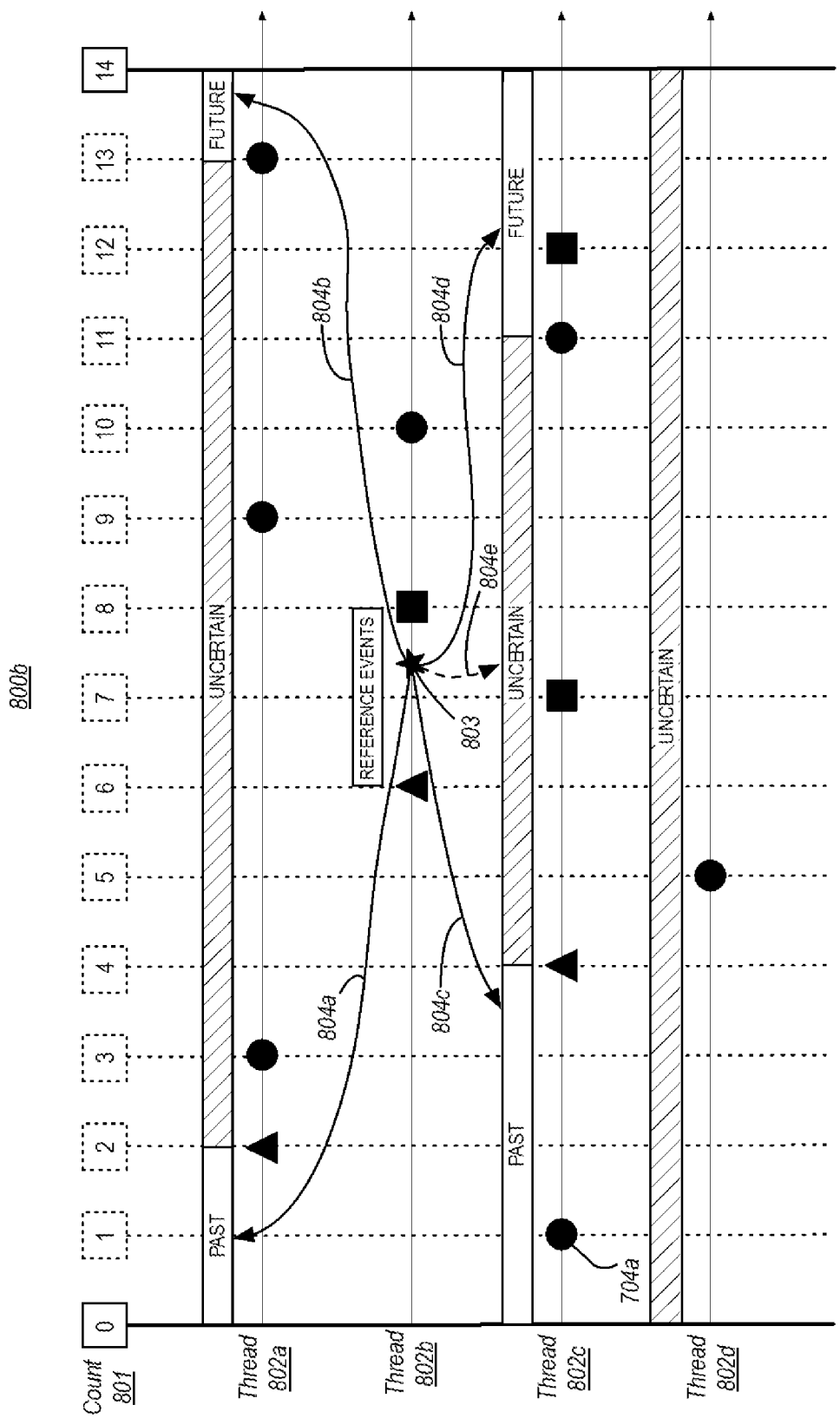
FIG. 8B illustrates an example of evaluating a function, such as a property getter, during trace replay and debugging in which the relative ordering of a memory access is unknown.
Figure 9:
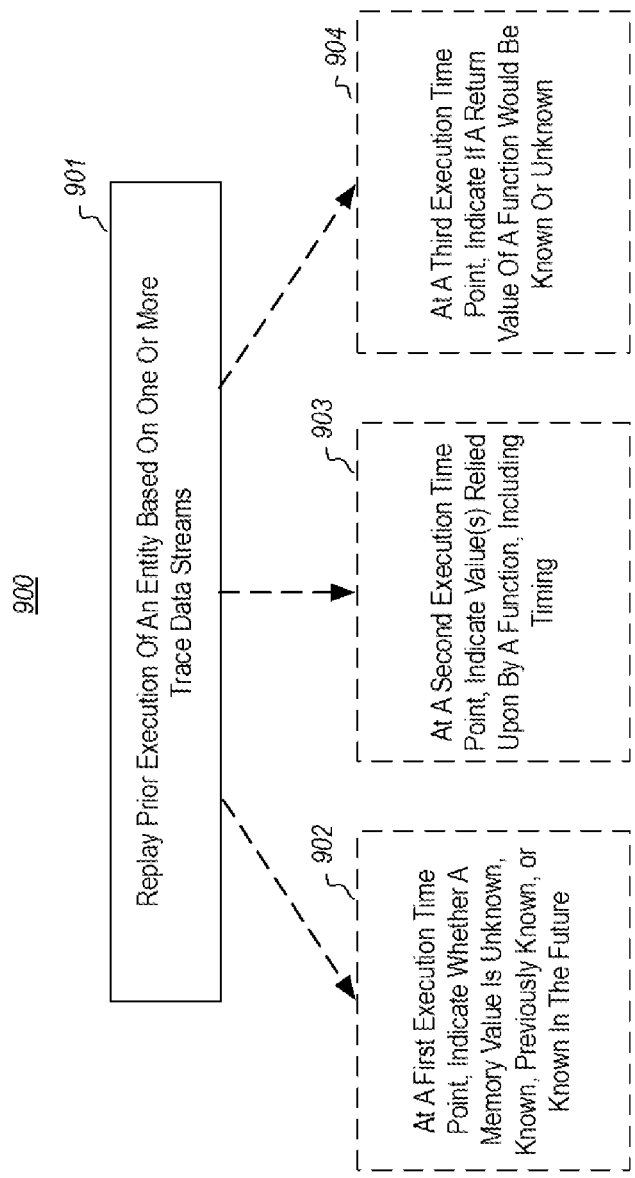
FIG. 9 illustrates a flowchart of an example method for presenting historical state associated with prior execution of an entity.

Turning now to FIG. 8B, illustrated is another example 800b of evaluating a function, such as a property getter, during trace replay and debugging. Example 800b is the same as example 800b, except that it also includes an arrow 804e indicating that the function whose execution is being evaluated or simulated at the execution time point corresponding to star 803 also relies on a value on thread 802b at a time when it is uncertain of the ordering of events on thread 802b versus the event at the star 804e. In these cases, if the value is actually available on thread 802c, the debugger 104c could present that value with an indication that the timing of when the value is valid is uncertain with respect to the subject function.

Notably, knowledge of if, and when, different memory values exist and are valid on one or more trace data streams can enable surfacing the values of code elements without needing to resort to any sort of heuristics to "guess" which values are valid at a given execution time point. This can be particularly useful in the context of functions (such as property getters) that did not execute during tracing, or in the context of evaluating functions at a different execution time point than when they originally executed during tracing, in order to surface overall knowledge of the value of the function as if it had executed at a particular execution time point. For example, referring to FIG. 8A, suppose that at a particular execution time point (e.g., the time point on thread 802b corresponding to the star 803), all of the values needed to generate the return value of the function at the execution time point (e.g., the return value of a function) are known (e.g., all of the values on threads 802a and 802c pointed to by arrows 804a-804d are known). In this case, the debugger 104c could provide an indication in the debugger window 401 that the value of the function at the execution time point would be known. Alternatively, suppose that at the particular execution time point at least one of the values needed to generate the return value of the function at the execution time point would not be known. For example, referring to FIG. 8B, suppose that the value on thread 802c pointed to by arrow 804e is not known. In this case, the debugger 104c could provide an indication in the debugger window 401 that the value of the function at the execution time point would be unknown.

In another example, referring to FIG. 8A, suppose that, from the perspective of the subject execution time point (e.g., star 803), the values corresponding to arrows 804a and 804b are from the same memory location (e.g., the same variable) and are definitely known during the time periods from counts A0 to A2 and counts A13 to A14 on trace 802a (e.g., based on CCP data and/or cache evictions, as described in connection with FIG. 6). If those values are identical during both of these time periods, and if there is no evidence on trace 802a that the values were modified during the time period from counts A2 to A13 (e.g., based on CCP data, cache misses, cache evictions, etc.), then it may be possible to confidently determine that the value of this memory location did not change during the period from counts A2 to A13.

In some embodiments, if multiple values are relied upon in generating a value (e.g., by a function such as a property getter), there may be insufficient information to determine that each of the multiple values are definitely known. Rather than simply reporting that the value of the function unknown, embodiments may report a value for the function along with a confidence level in the value reported. For example, if there is only an 80% confidence in the correct value of each of three values relied upon, a confidence level of about 51% could be reported (i.e., 1.0*0.8*0.8*0.8). As another similar example, the confidence in the correctness of each of three values relied upon is 80%, 70%, and 80%, a confidence level could be reported as being no greater than 70% (e.g., a most pessimistic of the individual probabilities), or some other value less than that most pessimistic value (e.g., 1.0*0.8*0.7*0.8, or approximately 45%).

Many of the embodiments just described in connection with functions such as property getters can also be applicable to data structures that "cover" a plurality of values. For example, a subject code element could be a data structure that, itself, contains a plurality of data elements (e.g., an array, a linked list, etc.). Similar to property getter functions, some of these contained data elements may not be "currently known" at the current execution time point in the debugger, and/or they may only be available on other threads. As such, embodiments could treat these values in much the same manner as the internal functions/values of property getter functions—i.e., individual values could be presented along with "next known" or "currently known" indicators, the values could be presented with an indication that their timing is uncertain with respect to the current watchpoint/breakpoint, the values could be presented along a timeline—potentially indications of ranges of their validity, etc.

In view of the components and data of computing environment 100 of FIG. 1, the example debugger 200 of FIG. 2, the example timeline 301 and trace 302 of FIG. 3, the example user interfaces 400a-400h of FIGS. 4A-4H, and the additional examples of FIGS. 6-8B, FIG. 9 illustrates a flowchart of an example method 900 for presenting historical state associated with prior execution of an entity.

As shown, method 900 can include an act 901 of replaying prior execution of an entity based on one or more trace data streams. In some embodiments, act 901 comprises replaying one or more segments of the prior execution of the entity based on one or more trace data streams storing a trace of the prior execution of the entity. For example, the replay component 202 of debugger 104c/200 can replay one or more segments of trace data stream 602a or 602b, or a trace data stream backing one of threads 702 or 802.

Based on having replayed the prior execution of an entity, method 900 can include one or more of (i) an act 902 of, at a first execution time point, indicating whether a memory value is unknown, known, previously known, or known in the future; (ii) an act 903 of, at a second execution time point, indicating value(s) relied upon by a function, including timing; or (iii) an act 904 of, at a third execution time point, indicating if a return value of a function would be known or unknown. It will be appreciated that method 900 could include each of acts 902-904, or a subset thereof.

In some embodiments, act 902 comprises, in connection with a first execution time point in the prior execution of the entity, presenting at a user interface a first indication of whether a memory value of a code element is, at the first execution time point, at least one of unknown, known, previously known, or known in the future. For example, as discussed in connection with FIG. 6, provided a trace contains sufficient information, it may be possible to know if, and where, a particular cache line has a value that is known. If the value is known, act 902 could also comprise presenting the memory value of the code element.

As was discussed in connection with FIG. 6, provided a trace contains sufficient information (e.g., one or more of a cache eviction(s) or CCP event(s)), it may be possible to determine ranges of execution time over which a value of a cache line is known. As such, act 902 could also comprise indicating a range of execution time over which the memory value is known to be valid. Additionally, as discussed in connection with FIGS. 7A, 7B, 7D, and 7F, using orderable events in various trace data streams, it may be possible to determine when events on other threads occurred with respect to a given point on a given thread (e.g., whether they were previously known in the past, or known in the future).

In some embodiments, act 903 comprises, in connection with a second execution time point in the prior execution of the entity, presenting at the user interface a second indication of at least one value relied upon by simulated execution of a first function as it would have executed at the second execution time point, along with an indication of a timing of knowledge of the at least one value in relation to the second execution time point. For example, as was discussed, at times a subject code element could be a function, such as a property getter function. In these cases, the "value" of the code element can be its return value.

As was illustrated in connection with FIGS. 8A and 8B, such a function may not have not have actually executed during tracing, and could rely on one or more internal variables or functions. As such, in act 903 the at least one value relied upon by the first function could be a value of a variable (memory location), or the return value of another function. If the function did not execute during tracing, act 903 could simulate execution of this function (and potentially internal functions) to obtain its return value. As was demonstrated in connection with FIGS. 8A and 8B, these internal values could be found in the past or in the future on another thread. As such, act 903 could include indicating that the at least one value is obtained in the future or in the past on another entity, with respect to the second execution time point on the entity. As demonstrated in FIG. 8B, however, it could be that a value relied upon has uncertain timing. In these cases, act 903 could include indicating that the timing is uncertain. Similar to act 902, act 903 could also include indicating that the at least one value is obtained from within a range of execution times on another entity, with respect to the second execution time point on the entity. In some implementations, a value whose timing is uncertain may be treated by the debugger 104c as being as substantially simultaneous with the execution of the function and/or or with the timing of one or more other values. In these implementations, if the debugger 104c is surfacing values that changed at substantially the same time, it could present values (even if from distinct threads) where the relative ordering of those two values is uncertain. Additionally, or alternatively, the debugger 104c could attempt to calculate or estimate the ordering of memory accesses across unordered regions based on knowledge of the values of the memory accesses and on knowledge of how the processor's memory model operates.

In some embodiments, act 904 comprises, in connection with a third execution time point in the prior execution of the entity, presenting at the user interface a third indication of one of: (i) that a return value of a second function would be known if the second function had executed at the third execution time point, based at least on values of all memory locations used by the second function being available in the one or more trace data streams, or (ii) that a return value of the second function would be unknown if the second function had executed at the third execution time point, based at least on a value of at least one memory location used by the second function being unavailable in the one or more trace data streams. For example, as was discussed in connection with FIG. 8A, if at a particular execution time point (e.g., the time point on thread 802b corresponding to the star 803), all of the values that would be needed to generate the return value of a function at the execution time point are known the debugger 104c could provide an indication that the value of the function at the execution time point would be known if execution of the function were to be simulated. Alternatively, if at the particular execution time point at last one of the values that would be needed to generate the value at the execution time point is not known the debugger 104c could provide an indication that the value of the function at the execution time point would be unknown.

Accordingly, embodiments herein leverage the wealth of information recorded in bit-accurate time travel traces to provide rich debugging experiences, including providing one or more visualizations of historical state associated with code element(s) that are part of a prior execution of an entity. As such, embodiments provide a richness of data not available in prior forms of debugging that can greatly enhance the ability of a debugger to present the operation of program code, which, in turn, can dramatically decrease the amount of time it takes to debug code. Reducing the amount of time taken to debug code directly reduces an amount of computing resources that are consumed in the debugging process.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computer system that includes one or more processors, for presenting historical state associated with a prior execution of an entity, the method comprising:
   replaying one or more segments of the prior execution of the entity based on one or more trace data streams storing a trace of at least the prior execution of the entity;
   in connection with replaying the one or more segments of the prior execution of the entity, and relying on one or more data values available in the one or more trace data streams, simulating execution of a function of the entity as it would have executed at a particular execution time point in the prior execution of the entity, wherein execution of the function was not traced into the one or more trace data streams during the prior execution of the entity; and
   based on replaying the one or more segments of the prior execution of the entity, and based on simulating execution of the function of the entity, presenting, in connection with the particular execution time point in the prior execution of the entity, a first indication at a user interface of at least one of the one or more data values relied upon by the simulated execution of the function, along with a second indication of a timing of knowledge of the at least one data value in relation to the particular execution time point.

2. The method as recited in claim 1, wherein the method also comprises presenting an indication of whether a memory value of a code element is, at the first execution time point, at least one of unknown, known, previously known, or known in the future, including presenting the memory value of the code element.

3. The method as recited in claim 2, wherein presenting the memory value of the code element includes indicating a range of execution time over which the memory value is known to be valid.

4. The method as recited in claim 3, wherein the range of execution time over which the memory value is known to be valid is determined based on one or more of a cache eviction or a cache coherence protocol (CCP) event logged in the one or more trace data streams.

5. The method as recited in claim 1, wherein the second indication of the timing of knowledge of the at least one data value in relation to the particular execution time point indicates that the at least one value is obtained in the future or in the past on another entity, with respect to the particular execution time point on the entity.

6. The method as recited in claim 1, wherein the second indication of the timing of knowledge of the at least one data value in relation to the particular execution time point indicates that the at least one value is obtained from within a range of execution times on another entity, with respect to the particular execution time point on the entity.

7. The method as recited in claim 1, wherein the indication of the timing of knowledge of the at least one data value in relation to the particular execution time point indicates that the timing is uncertain.

8. The method as recited in claim 1, wherein the at least one data value relied corresponds to a memory location.

9. The method as recited in claim 1, wherein the at least one data value relied upon by the simulated execution of the function corresponds to a return value of another function.

10. The method as recited in claim 1, wherein the method also comprises presenting an indication that a return value of a particular function would be known if the particular function had executed at the particular execution time point, based at least on values of all memory locations used by the particular function being available in the one or more trace data streams.

11. The method as recited in claim 10, further comprising indicating a range of execution time of the entity over which the return value of the particular function would be known.

12. The method as recited in claim 1, wherein the method also comprises presenting an indication that a return value of a particular function would be unknown if the particular function had executed at the particular execution time point, based at least on a value of at least one memory location used by the particular function being unavailable in the one or more trace data streams.

13. A computer system, comprising:
   one or more processors; and
   one or more computer-readable media having stored thereon computer-executable instructions that are executable by the one or more processors to cause the computer system to perform at least the following:
      replay one or more segments of the prior execution of the entity based on one or more trace data streams storing a trace of at least the prior execution of the entity;
      in connection with replaying the one or more segments of the prior execution of the entity, and relying on one or more data values available in the one or more trace data streams, simulating execution of a function of the entity as it would have executed at a particular execution time point in the prior execution of the entity, wherein execution of the function was not traced into the one or more trace data streams during the prior execution of the entity; and
      based on replaying the one or more segments of the prior execution of the entity, and based on simulating execution of the function of the entity, presenting, in connection with the particular execution time point in the prior execution of the entity, a first indication at a user interface of at least one of the one or more data values relied upon by the simulated execution of the function, along with a second indication of a timing of knowledge of the at least one data value in relation to the particular execution time point.

14. The computer system of claim 13, wherein the computer system also presents indication, of whether a memory value of a code element is, at the first execution time point, at least one of unknown, known, previously known, or known in the future, including presenting the memory value of the code element, presenting the memory value of the code element including indicating a range of execution time over which the memory value is known to be valid.

15. The computer system of claim 14, wherein the range of execution time over which the memory value is known to be valid is determined based on one or more of a cache eviction or a cache coherence protocol (CCP) event logged in the one or more trace data streams.

16. The computer system of claim 13, wherein the second indication of the timing of knowledge of the at least one data value in relation to the particular execution time point indicates that the at least one value is obtained in the future or in the past on another entity, with respect to the particular execution time point on the entity.

17. The computer system of claim 13, the at least one data value relied upon by the simulated execution of the function corresponds to a return value of another function that did not execute during tracing, and wherein the computer system simulates execution of the another function to obtain the at least one data value relied upon by the function.

18. The computer system of claim 13, wherein the computer system also presents an indication that a return value of the a particular is known, and wherein the computer system indicates a range of execution time of the entity over which the return value of the particular function would be known.

19. A computer program product comprising one or more hardware storage devices having stored thereon computer-executable instructions that are executable by one or more processors to cause a computer system to perform at least the following:
    replay one or more segments of the prior execution of the entity based on one or more trace data streams storing a trace of at least the prior execution of the entity;
    in connection with replaying the one or more segments of the prior execution of the entity, and relying on one or more data values available in the one or more trace data streams, simulating execution of a function of the entity as it would have executed at a particular execution time point in the prior execution of the entity, wherein execution of the function was not traced into the one or more trace data streams during the prior execution of the entity; and
    based on replaying the one or more segments of the prior execution of the entity, and based on simulating execution of the function of the entity, presenting, in connection with the particular execution time point in the prior execution of the entity, a first indication at a user interface of at least one of the one or more data values relied upon by the simulated execution of the function, along with a second indication of a timing of knowledge of the at least one value in relation to the particular execution time point.

* * * * *